· US012061634B2

(12) United States Patent
Malhotra et al.

(10) Patent No.: US 12,061,634 B2
(45) Date of Patent: Aug. 13, 2024

(54) METHODS AND SYSTEMS FOR PERFORMING CONTEXT MAINTENANCE ON SEARCH QUERIES IN A CONVERSATIONAL SEARCH ENVIRONMENT

(71) Applicant: Rovi Guides, Inc., San Jose, CA (US)

(72) Inventors: Manik Malhotra, Durham, NC (US); Prabhat Gupta, Uttar Pradesh (IN); Sahil Malik, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 872 days.

(21) Appl. No.: 17/041,247

(22) PCT Filed: Mar. 26, 2018

(86) PCT No.: PCT/US2018/024360
§ 371 (c)(1),
(2) Date: Sep. 24, 2020

(87) PCT Pub. No.: WO2019/190462
PCT Pub. Date: Oct. 3, 2019

(65) Prior Publication Data
US 2021/0103606 A1  Apr. 8, 2021

(51) Int. Cl.
*G06F 40/00* (2020.01)
*G06F 16/33* (2019.01)
(Continued)

(52) U.S. Cl.
CPC ...... *G06F 16/3329* (2019.01); *G06F 16/3334* (2019.01); *G06F 16/3344* (2019.01); *G06F 40/284* (2020.01); *G06N 3/02* (2013.01)

(58) Field of Classification Search
CPC ............ G06F 16/3329; G06F 16/3334; G06F 16/3344; G06F 40/284; G06F 40/40;
(Continued)

(56) References Cited

U.S. PATENT DOCUMENTS 6,239,794 B1    5/2001  Yuen
6,564,378 B1    5/2003  Satterfield
(Continued)

OTHER PUBLICATIONS

Malmi, Eric, Aristides Gionis, and Evimaria Terzi. "Active network alignment: A matching-based approach." Proceedings of the 2017 ACM on Conference on Information and Knowledge Management. 2017. (Year: 2017).*

(Continued)

*Primary Examiner* — Edgar X Guerra-Erazo
(74) *Attorney, Agent, or Firm* — Haley Guiliano LLP

(57) ABSTRACT

Systems and methods are described herein that maintain a context in a conversational search systems. An artificial neural network accepts current and previous queries as input and outputs a value indicating whether the previous query and the current query should undergo a merge operation or a replacement operation to maintain an intent of the user. To perform a merge operation, the previous query and the current query are combined to form a search query. To perform a replace operation, a portion of the previous query is replaced with a portion of the current query.

18 Claims, 10 Drawing Sheets

(51) Int. Cl.
*G06F 16/332* (2019.01)
*G06F 40/284* (2020.01)
*G06N 3/02* (2006.01)

(58) Field of Classification Search
CPC ......... G06F 16/24522; G06F 16/90332; G06F 16/243; G06F 16/248; G06F 16/3325; G06F 16/3338; G06F 16/2455; G06F 16/313; G06F 2207/4824; G06F 16/2433; G06N 3/02; G06N 3/045; G06N 3/08; G06N 3/084; G06N 20/00; G06N 3/048; G06N 3/047; G06N 5/04; G06N 3/0895; G06N 3/09; G06N 3/096; G06N 3/0475; G06N 3/082; G06N 3/088; G06N 3/086; G06N 3/091; G06N 3/0985; G10L 15/16; G10L 25/30; G10L 15/18
See application file for complete search history.

(56) References Cited

U.S. PATENT DOCUMENTS

| | | | |
|---|---|---|---|
| 7,165,098 B1 | 1/2007 | Boyer | |
| 7,409,335 B1* | 8/2008 | Horvitz | G06F 40/35 |
| | | | 707/999.005 |
| 7,761,892 B2 | 7/2010 | Ellis | |
| 8,046,801 B2 | 10/2011 | Ellis | |
| 9,183,257 B1 | 11/2015 | Buchanan et al. | |
| 2002/0174430 A1 | 11/2002 | Ellis | |
| 2005/0251827 A1 | 11/2005 | Ellis | |
| 2010/0153885 A1 | 6/2010 | Yates | |
| 2012/0096030 A1 | 4/2012 | Kim | |
| 2015/0142420 A1* | 5/2015 | Sarikaya | G10L 15/1815 |
| | | | 704/9 |
| 2015/0199402 A1* | 7/2015 | Agrawal | G06F 16/2228 |
| | | | 707/723 |
| 2017/0060994 A1* | 3/2017 | Byron | G10L 15/22 |
| 2017/0357635 A1* | 12/2017 | Mohaideen P | G06F 16/3338 |

OTHER PUBLICATIONS

Marcus, Ryan, et al. "Neo: A learned query optimizer." arXiv preprint arXiv:1904.03711 (2019). (Year: 2019).*

Lian, Yijiang, et al. "An end-to-end Generative Retrieval Method for Sponsored Search Engine—Decoding Efficiently into a Closed Target Domain." arXiv preprint arXiv:1902.00592 (2019). (Year: 2019).*

International Search Report and Written Opinion of PCT/2018/024360 dated Nov. 16, 2018.

* cited by examiner

| # | Model Previous Query | Model Current Query | Merge/Replace Flag |
|---|---|---|---|
| 1 | What TV shows are on now? | How about movies | Replace |
| 2 | Show me Game of Thrones | The first episode | Merge |

FIG. 2

METHODS AND SYSTEMS FOR PERFORMING CONTEXT MAINTENANCE ON SEARCH QUERIES IN A CONVERSATIONAL SEARCH ENVIRONMENT

CROSS-REFERENCE TO RELATED APPLICATIONS

This application is a national stage application under 35 U.S.C. § 371 of International Application PCT/US2018/024360, filed Mar. 26, 2018, which is hereby incorporated by reference herein in its entirety.

BACKGROUND

Context maintenance is an important attribute of modern natural language processing systems to allow a user to communicate with a computer system in a normal conversational manner. For example, a user may prompt the search system with a first query, "Show me supermarkets open now," followed by a second prompt, such as, "That sell organic goods." In a conversational setting, a human would understand the user to be searching for supermarkets that are open now and that sell organic goods. Alternatively, the user may follow the first prompt with a third prompt such as, "How about bodegas?" In a conversational setting, a human would understand the user changed the context of the search and is now instead searching for bodegas open now. Oftentimes, computers struggle with determining whether to maintain context between two queries or to perform a context switch. The conventional approach to solve this problem is to define a set of rules to determine whether a first query and a second query are interrelated and perform the context switch when they are not related. However, rule-based systems are rigid and require programmers to think about and try to address every possible situation that may arise during a natural language conversation, resulting in a system that has only a limited number of possible query inputs. Therefore, the user is burdened with learning the inputs recognized by the system or must rephrase queries to receive desired results from the convention system.

SUMMARY

Accordingly systems and methods are described herein that address the shortcomings in conventional conversation systems via a novel technique for utilizing an artificial neural network to determine whether current and previous queries should be merged, to maintain a context, or replaced, to change a context, of a user's desired search input. Specifically, the media guidance application may generate a neural network that takes words of a first query and words of a second query and generates an output indicating whether the first query and the second query should be merged or whether a portion of the first query should be replaced with a portion of the second query (e.g., to either maintain and narrow a scope of a conversational context or to change the scope of a conversational context).

The media guidance application may train the neural network using a training data set having known pairs of first queries, second queries and correct merge or replace outputs. For example, the media guidance application may receive a data set of known correct results (e.g., a correct merge or replace indication for a given first query and second query pair) and may updated values in the neural network based on the data set. For example, the media guidance application may determine that when a query has the terms "what is . . . " in the first query and "how about . . . " in the second query that the user is indicating a replace operation (e.g., because the media guidance application determines that a majority of the queries in the data set having "what is . . . " in the first query and "how about . . . " in the second query are associated with a replace operation) and may therefore update values in the neural network to produce a "replace" output when those words are input as the first and the second query. After the media guidance application trains the data set, the media guidance application may utilize the neural network to determine whether a current query and a previous query should be merged or replaced.

The media guidance application may receive a first user query such as "What movies are in theaters?" and a second query, such as "ones featuring Tom Cruise" from a user. The media guidance application may map words in the query to inputs of the neural network. For example, the media guidance application may map the words "What," "movies," "are," "in," and "theaters" to matching words at input nodes of the neural network associated with the first query and may map the words "ones," "featuring," "Tom," and "Cruise" to matching words at input nodes of the neural network associated with the second query. The media guidance application may compute an output value based on the trained neural network. For example, the media guidance application may determine, based on the trained values in the neural network, that the first and second queries are similar to queries in the training set that are associated with a merge operation. In response to determining that the first and second queries are similar to queries in the training set associated with a merge operation (e.g., based on weights between nodes in the neural network generated based on the training data set), the media guidance application may output a merge indication from the neural network.

The media guidance application may merge the first query and the second query in response to generating a merge output from the neural network. In response to generating a merge output, the media guidance application may generate a search query comprising both of the first query and the second query. For example, the media guidance application may generate a search query such as "What movies are in theaters featuring Tom Cruise?" The media guidance application may retrieve search results corresponding to the search query. For example, the media guidance application may retrieve search results indicating movies that feature Tom Cruise and that are in movie theaters. This way, the media guidance application may accurately narrow the context to include words from the first query and words from the second query and may generate a search query that most closely approximates the context that was intended by the user.

In contrast, when the media guidance application determines that a first portion of the first query should be replaced with a second portion of the second query, the media guidance application may generate a search query comprising a portion of the first query and a portion of the second query. For example, the media guidance application may determine that a portion of the first query should be replaced with a portion of the second query when the media guidance application receives the first query "What televisions shows are available?" and a second query "How about movies?" (e.g., based on inputting the first query and the second query to the neural network and determining, based on the neural network that there is a change in context). In response to determining that the media guidance application should replace a portion of the first query with a portion of the second query, the media guidance application may identify a portion of the second query that corresponds to a portion of the first query and may replace the first portion with the second portion. For example, the media guidance application may identify that the "movies" are media and that "television shows" are also media. Accordingly, the media guidance application may replace the phrase "television shows" in the first query with "movies" in the second query. For example, the media guidance application may generate a search query "What movies are available?" and may identify search results corresponding to the search query. This way, the media guidance application may accurately update the context of the conversational queries and may generate a search query that most closely approximates the context that was intended by the user.

In some aspects, the media guidance application may generate a neural network that takes a previous query and a current query as inputs and outputs a result indicating a merge or replace operation, where the neural network comprises a first set of nodes associated with an input layer of the neural network and a second set of nodes associated with an artificial layer of the neural network. For example, the media guidance application may generate a neural network to model and predict a user's intention to either merge or replace a portion in a first and second queries. For example, the media guidance application may generate a first set of nodes corresponding to an input layer of the neural network and may associate each node of the neural network with a corresponding word or phrase. The media guidance application may also generate a second set of nodes corresponding to an artificial layer in the neural network, where each node of the second set of nodes is connected to at least one node of the first set of nodes. The media guidance application may utilize the input nodes to represent words in the first and second queries. For example, the media guidance application may map words in the first query and words in the second query to the words associated with nodes in the first set of nodes. The media guidance application may retrieve weights associated with the connections between the first set of nodes and the second set of nodes to compute values for the second set of nodes (e.g., by multiplying values in the first set of nodes by the weights and then summing the resultant multiplications). The media guidance application may retrieve the values associated with the nodes in the second set of nodes to determine whether to merge or replace the first and second queries. Because the media guidance application trains the neural network to model whether a query should be merged or replaced based on words in the queries and then utilizes the training data (e.g., based on the weights between nodes), the neural network is able to predict merge and replace operations for queries that were not already in the training set.

The media guidance application may train the neural network, based on a training data set, to determine weights associated with connections between the first set of nodes and the second set of nodes in the neural network. For example, the media guidance application may retrieve a training data set from memory wherein the training data set comprises a pair including a model current query and a model previous query and a flag indicating whether the model previous query and model current query should be merged or replaced. For example, the training data set may comprise a first pair with a first query "What is the weather like in New York?" and a second query "How about in D.C.?" and a corresponding replace flag (e.g., because the user's intent is to ask "What is the weather like in D.C.?" by replacing New York with D.C. in the first query), and a second pair with a first query "What are some Tom Cruise movies?" and a second query "Are any action movies?" and a corresponding merge flag (e.g., because the user's intent is to ask "What are some Tom Cruise action movies?" and therefore the queries should be merged to update the context).

In some embodiments, the media guidance application may input the model previous query and the model current query to nodes of the first set of nodes. For example, the media guidance application may identify words in the first query and may map the words in the first query to words associated with nodes in the first set of nodes (e.g., the nodes on the input layer of the neural network). For example, the mapping may include incrementing, by the media guidance application, a value associated with each node in the first layer that corresponds to a word in the first query. Because the media guidance application may compute the values of the second set of nodes based on multiplying the value of the first set of nodes and weights associated with those nodes, the incrementing has the effect of weighting the decision as to whether the query should be merged or replaced. Likewise, the media guidance application may map words in the second query to words associated with nodes in the first set of nodes and may increment a value associated with the mapped nodes.

In some embodiments, the media guidance application may compute, based on weights between the first set of nodes in the input layer and the second set of nodes in the artificial layer, respective values for each node of the second set of nodes in the artificial layer. For example, the media guidance application may initialize the weights between nodes in the first set of nodes and the second set of nodes to one. The media guidance application may compute values for nodes in the second set of nodes based on multiplying values in the first set of nodes by the weights connecting nodes in the first set of nodes with nodes in the second set of nodes (e.g., multiply by one for an initial first pass). Because the neural network has weights initialized to an initial value, the neural network will likely miscompute the outcome and will need reiterate to correct an error between the computed outcome and the desired outcome by adjusting the weights in the neural network.

In some embodiments, the media guidance application may compute, based on the respective values for each node in the second set of nodes in the artificial layer, a model result indicating a merge or replace operation for the model previous query and the model current query. The media guidance application may utilize the computed values for nodes in the artificial layer and the weights connecting the nodes in the artificial layer to an output node to compute a resulting merge or replace operation. For example, the media guidance application may initialize the weights of the connections between the nodes in the artificial layer and the output node to one. The system may add up the values of each of the nodes in the artificial layer and may compare the sum to the expected output value (e.g., a value approximately equal to 1 may be equivalent to a merge operation and a value approximately equal to 0 may be equivalent to a replace operation).

In some embodiments, the media guidance application may compare the model result to the flag to determine whether the flag matches the model result. For example, the media guidance application may receive the flag from the set of model search results and may compare the flag to the output value to determine whether the media guidance application accurately computed whether there is a merge or replace operation using the neural network. For example, the media guidance application may determine that when the output of the neural network does not match the output of the training set that the neural network needs to be updated to better estimate outputs having similar characteristics (e.g., to more accurately predict a merge or replace operation for similar input and output queries). Accordingly, the media guidance application may calculate an error value, such as a difference between the value at the output node and the desired output. For example, the media guidance application may compute a value of 0.2 for an exemplary model current and previous query. If the media guidance application determines that the output should be a merge operation (e.g., a value of 1) the media guidance application may determine that the error is 0.8. Therefore the media guidance application may update the weights in the neural network based on a computed error value. Therefore, the media guidance application will update the weights corresponding to the nodes which actively had an impact on the computation of the resultant merge and replace operation.

In some embodiments, the media guidance application may update the weights associated with the nodes of the neural network based on a first error value in response to determining that the flag does not match the model result. For example, the media guidance application may determine that when the flag does not match the model result, the media guidance application will determine an amount of error between the computed value and the expected value (e.g., the value at the output node and the value indicating the correct merge or replace operation). The media guidance application may utilize the error value to update the weights in the neural network. For example, the media guidance application may increase particular weights of connections between nodes in the neural network by two based on determining that the error value was 0.8 (e.g., because an error value of 0.8 may correspond to a correction factor of two in a lookup table accessed by the media guidance application).

In some embodiments, the media guidance application may update the weights associated with nodes of the neural network based on a second error value that is less than the first error value, in response to determining that the flag matches the model result. The media guidance application may compute a second error value that is less than the first error value because the media guidance application may determine that the neural network requires a smaller modification of the weights in the neural network when the value at the output node is close to the correct value.

In some embodiments, the media guidance application may receive, from a user, a first query and a second query, wherein the first query is received prior to receiving the second query. For example, the media guidance application may access a microphone input and may receive a spoken first query and a spoken second query from a user of the media guidance application. The media guidance application may convert the received first query and second query to a string using a speech to text algorithm.

In some embodiments, the media guidance application may receive the first query from the user at a first time and may receive the second query from the user at a second time. The media guidance application may analyze the context between the first query and the second query based on a determination that less than a threshold amount of time has elapsed between the first time and the second time. For example, the media guidance application may determine that the two queries are contextually related when the second query is received shortly after receiving the first query (e.g., within a few minutes or a few seconds).

In some embodiments, the media guidance application may generate a first set of tokens based on terms in the first query and a second set of tokens based on terms in the second query. For example, the media guidance application may utilize a speech-tokenizing algorithm to split the queries into tokens. For example, the media guidance application may split up the query based on words in the query and may generate a different token for each word in the query.

In some embodiments, the media guidance application may generate the tokens based on analyzing the characters in the query. The media guidance application may receive a set of delimiting characters from memory (e.g., a set of characters that typically delimit boundaries between words, such as spaces, hyphens, etc.). The media guidance application may compare the set of delimiting characters to a sequence of characters in the first query to identify a first position of a first character in the first query and a second position of a second character in the first query, each matching a delimiting character of the set of delimiting characters. For example, the media guidance application may determine positions in the string that correspond to spaces. The media guidance application may generate a token of the first query comprising characters of the sequence of characters between the first position and the second position. For example, the media guidance application may generate a token based on the characters between the spaces (e.g., the word between the detected spaces).

In some embodiments, the media guidance application may eliminate tokens associated with filler words from a set of tokens associated with the first and second queries (e.g., because the filler words such as "uh," "like," etc. may not meaningfully contribute to the understanding of the intent of a query using the neural network). For example, the media guidance application may compare the first token to a set of filler words to determine whether the token matches a filler word of the set of filler words and may ignore tokens that match filler words by excluding those tokens from the set of tokens associated with the query.

The media guidance application may map the first set of tokens and the second set of tokens to the first set of nodes. For example, the media guidance application may identify nodes in the input layer of nodes that correspond to tokens in the first set of tokens and nodes that correspond to tokens in the second set of tokens. For example, the media guidance application may allocate a first subset of nodes of the input layer for the previous query and a second subset of nodes of the input layer with the current query. The media guidance application may compare the tokens of the first query to tokens associated with nodes in the first subset of nodes (e.g., because the first query is received prior to the second query and is therefore the previous query). The media guidance application may compare the tokens of the second query to tokens associated with the second subset of nodes (e.g., because the second query is received after the first query and is therefore the current query).

In some embodiments, in response to matching a token associated with one of the first query and the second query to a token associated with a node in the input layer, the media guidance application may update a value associated with the node. For example, the media guidance application may generate a token "where" for the query "Where is the supermarket?" The media guidance application may compare the token "where" to a plurality of tokens in the input layer of the neural network and may identify a node in the input layer of the neural network associated with the term "where." In response to identifying the node, the media guidance application may increment a value associated with the node. For example, the media guidance application may change a value of the node from 0 to 1 to indicate that a token associated with the node is present in the query. The media guidance application may use the value when computing values for the artificial layer in the neural network based on the weights between the nodes in the input layer and the nodes in the artificial layer.

The media guidance application may determine, using the weights associated with the connections between the first set of nodes and the second set of nodes, a value indicating whether the first query and the second query are associated with a result indicating a merge or replace operation. For example, the media guidance application may utilize values associated with nodes in the input layer of the neural network and may multiply those values with weights connecting nodes in the input layer to corresponding nodes in the artificial layer.

The media guidance application may utilize the values of the nodes in the artificial layer to compute an output value indicating a merge or replace operation based on multiplying the values of nodes in the artificial layer with weights associated with the nodes of the artificial layer and the output node. For example, the media guidance application may retrieve a third weight indicating a strength of association between the second node and the output node and a fourth weight indicating a strength of association between the third node and the output node. The media guidance application may multiply the value associated with the second node with the third weight to determine a value associated with the output node.

The media guidance application may compare the value to a threshold value to determine whether the value at the output node indicates a merge or replace operation. For example, the media guidance application may determine that, after normalization, merge operations correspond to an output value between 0 and 0.5 and that replace operations correspond to an output value between 0.51 and 1. Therefore, the media guidance application may determine that for an output value of 0.4 the operation is a merge, but for an output value of 0.9 the operation is a replace.

In response to determining, based on the output value, that the operation is a merge operation, the media guidance application may merge the first query and the second query. For example, the media guidance application may generate a search query based on merging tokens from the first query with tokens from the second query. For example, if the first query is "Find me somewhere to eat" and the second query is "heathy food!" the media guidance application may generate a search query of "Find me somewhere to eat heathy food" based on merging the words from the first query and the words in the second query to generate the search query. For example, the media guidance application may merge the first query and the second query to maintain or narrow a context associated with the first query (e.g., by adding terms to a search query from the second query to the first query).

The media guidance application may utilize the merged search query to identify search results associated with the merged search query. For example, the media guidance application may retrieve search results for healthy places to eat when searching a restaurant database with the query "Find me somewhere to eat healthy food."

In response to determining, based on the value, that the first query and the second query are associated with a result indicating a replace operation, the media guidance application may replace a portion of the first query with a portion of the second query to generate a search query. For example, the media guidance application may replace the portion of the first query with a portion of the second query to change the context of the first query from a first context to a second context. For example, the media guidance application may identify a portion of the first query that corresponds to a portion of the second query and may replace the portion of the second query with the portion of the first query. For example, the media guidance application may determine that when the first query is "what movies are on tonight?" and the second query is "How about TV shows?" that the user is trying to modify a context of the query (e.g., based on the analysis by the neural network as described above). For example, the media guidance application may compare tokens in the first query to tokens in the second query to identify types associated with each of the tokens. The media guidance application may identify types for the tokens associated with the first query. For example, the media guidance application may determine that the token "movies" is associated with a media type (e.g., because movies are media) and the token "tonight" is associated with a time type (e.g., because tonight indicates a time). The media guidance application may identify types associated with the tokens of the second query. For example, the media guidance application may determine that the token "TV shows" is associated with a media type (e.g., because TV shows are media). The media guidance application may determine that the media guidance application should replace the token "movies" in the first query with the token "TV shows" from the second query because the two tokens are of the same type. The media guidance application may replace tokens of the same type to change the context from a first context to a second context but maintain the structure of the query (e.g., when a user is requesting media it changes the context of what media is being searched but does not change the scope of the query).

In some embodiments, the media guidance application may generate for display search results corresponding to a search query generated based on replacing the first portion of the first query with the second portion of the second query. For example, the media guidance application may replace a first portion of the first query with a second portion of a second query as described above to generate a search query. The media guidance application may transmit the query to a search database to retrieve search results associated with the query. For example, the media guidance application may generate a search query "What TV shows are on tonight?" based on replacing "movies" in the first query with "TV shows" from the second query. The media guidance application may search a media database for television shows that are on that evening and may generate for display listings corresponding to the search results.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of neural network training data, in accordance with some embodiments of the disclosure;

DETAILED DESCRIPTION

Figure 1:
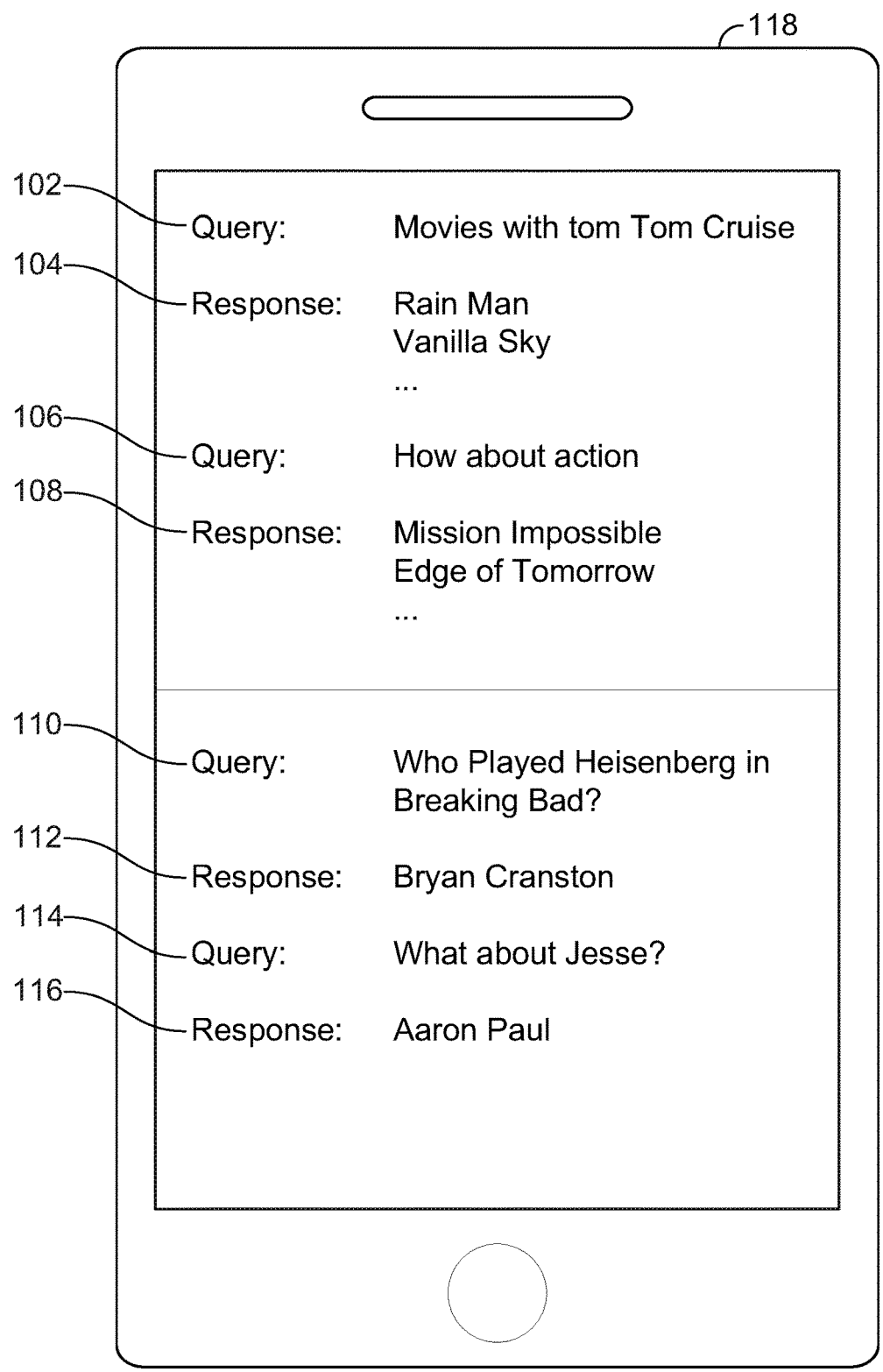
FIG. 1 shows an illustrative embodiment of a display screen depicting a search application, in accordance with some embodiments of the disclosure.

Accordingly systems and methods are described herein that address the shortcomings in conventional conversation systems via a novel technique for utilizing an artificial neural network to determine whether current and previous queries should be merged, to maintain a context, or replaced, to change a context, of a user's desired search input. Specifically, the media guidance application may generate a neural network that takes words of a first query and words of a second query and generates an output indicating whether the first query and the second query should be merged or whether a portion of the first query should be replaced with a portion of the second query (e.g., to either maintain and narrow a scope of a conversational context or to change the scope of a conversational context).

For example, the media guidance application may generate a graph comprising a collection of nodes and connections between the nodes. The media guidance application may divide nodes of the graph into layers. For example, the media guidance application may allocate a portion of the nodes as input nodes for indicating which words appear in the previous and current queries and for inputting said data into the neural network. Each node of the input layer may be associated with a corresponding token for representing whether the token appears in the current or previous query. For example, the media guidance application may generate a node that is associated with the token "movie" and may increment a value associated with the "movie" node whenever the token "movie" appears in a query. Each node of the input layer may be associated with one or more nodes associated with an artificial layer. The media guidance application may generate nodes on an artificial layer for representing latent relationships between nodes and for storing intermediate calculations when determining whether the current query and the previous query correspond to a merge or replace operation. For example, the media guidance application may create connections between nodes in the input layer and nodes in the artificial layer and may generate weights for each of the connections based on an expected strength of relationship between the nodes. For example, if the media guidance application determines that "movie" node of the input layer is highly correlated with an artificial media node in the artificial layer, the media guidance application may generate a large weight between the "media" node and the logical node in the artificial layer representing media. In contrast, the media guidance application may assign a weak strength for a connection between the "movie" node and a logical node in the neural network corresponding to house chores (e.g., because there may not be many movies about house chores).

The media guidance application may generate one or more output nodes of the neural network to indicate a value as to a merge or replace operation on the query. For example, the media guidance application may connect a subset of nodes in the artificial layer to an output node and may compute a value for the output node based on the values of the nodes in the artificial layer and a weight of the connections between the nodes in the artificial layer with the output node. For example, the media guidance application may determine a value for the output node by receiving a value of a node in the artificial layer, and weighting the value based on the weight of the connection between the node and the output node. The media guidance may replicate this computation for all nodes in the artificial layer having a connection to the output node and may compute a sum of the results as the final output value.

The media guidance application may train the neural network using a training data set having known pairs of first queries, second queries and correct merge or replace outputs. An exemplary training data set is described further below with respect to FIG. 2. For example, the media guidance application may receive a data set of previous and current queries having known correct results (e.g., a correct merge or replace indication for a given first query and second query pair) and may update values in the neural network based on the data set. For example, the media guidance application may initialize the weights in a neural network to an initial value. The media guidance application may then utilize a back-propagation algorithm with the training data to iteratively update values in the neural network based on the training data set. For example, the media guidance application may compute the output value for a first set of current and previous queries in the training data set. The media guidance application may compare the output of the neural network to a known correct output in the training data set. The media guidance application may compute an error between the computed output and the correct output and may update the values in the neural network based on the error value.

For example, the media guidance application may determine that when a query has the terms "What is . . . " in the first query and "How about . . . " in the second query, the user is indicating a replace operation (e.g., because the media guidance application determines that a majority of the queries in the data set having "What is . . . " in the first query and "How about . . . " in the second query are associated with a replace operation) and the media guidance application may therefore update values in the neural network to produce a "replace" output when those words are input as the first and the second query.

The media guidance application may provide a mechanism for improving and updating the neural network based on user feedback. For example, the media guidance application may provide a system that allows for a user to provide feedback as to whether a resultant merge or replace operation was correct. The media guidance application may automatically process the feedback and may update the neural network based on the feedback to produce more accurate results. For example, the media guidance application may assume that the feedback comprises the "correct" merge or replace operation indication. The media guidance application may compute an error value between the "correct" merge or replace operation to the value computed by the media guidance application. The media guidance application may utilize the error value to update the weights in the neural network.

The media guidance application may receive a first user query, such as, "What movies are in theaters?" and a second query, such as, "Ones featuring Tom Cruise," from a user. The media guidance application may map words in the query to inputs of the neural network. For example, the media guidance application may map the words "What," "movies," "are," "in," and "theaters" to matching words at input nodes of the neural network associated with the first query and may map the words "ones," "featuring," "Tom," and "Cruise" to matching words at input nodes of the neural network associated with the second query. For example, the media guidance application may allocate a first portion of the nodes of the input layer to the first query and a second portion of the nodes of the input layer to the second query. That way, the media guidance application can accurately represent whether tokens appear in the first query or in the second query as input to the neural network.

The media guidance application may compute an output value based on the trained neural network. For example, the media guidance application may determine, based on the weights between nodes in the neural network, that the first and second queries are similar to queries in the training set that are associated with a merge operation. In response to determining that the first and second queries are similar to queries in the training set associated with a merge operation (e.g., based on weights between nodes in the neural network generated based on the training data set), the media guidance application may output a merge indication from the neural network. Because the media guidance application utilizes the weights of the neural network, trained based on previous queries, the media guidance application can accurately provide an estimate of whether the media guidance application should merge or replace queries which were not specifically part of the training set.

In response to identifying a merge operation, based on the neural network, the media guidance application may generate a search query comprising both of the first query and the second query. For example, the media guidance application may generate a search query such as "What movies are in theaters featuring Tom Cruise?" The media guidance application may retrieve search results corresponding to the search query. For example, the media guidance application may retrieve search results indicating movies that feature Tom Cruise and that are in movie theaters. This way, the media guidance application may accurately narrow the context to include words from the first query and words from the second query and may generate a search query that most closely approximates the context that was intended by the user.

In contrast, when the media guidance application determines that a first portion of the first query should be replaced with a second portion of the second query (e.g., based on generating a merge output from the neural network), the media guidance application may generate a search query comprising a portion of the first query and a portion of the second query. For example, the media guidance application may determine that a portion of the first query should be replaced with a portion of the second query when the media guidance application receives the first query, "What televisions shows are available?" and a second query, "How about movies?" (e.g., based on inputting the first query and the second query to the neural network and determining, based on the neural network, that there is a change in context). In response to determining that the media guidance application should replace a portion of the first query with a portion of the second query, the media guidance application may identify a portion of the second query that corresponds to a portion of the first query and may replace the first portion with the second portion. For example, the media guidance application may identify that "movies" are media and that "television shows" are also media. Accordingly, the media guidance application may replace the phrase "television shows" in the first query with "movies" in the second query. For example, the media guidance application may generate a search query "What movies are available?" and may identify search results corresponding to the search query. This way, the media guidance application may accurately update the context of the conversational queries and may generate a search query that most closely approximates the context that was intended by the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 4:
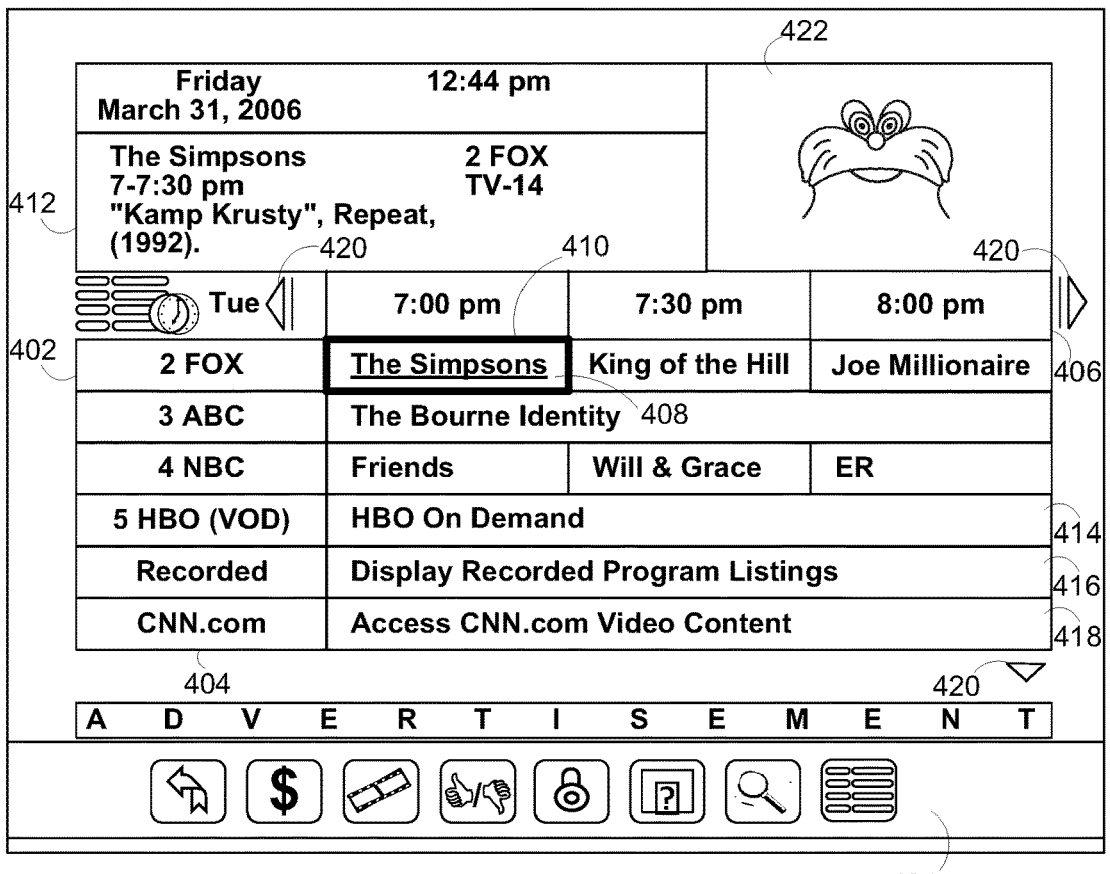
FIG. 4 shows an illustrative example of a media guidance display that may be presented in accordance with some embodiments of the disclosure.
Figure 5:
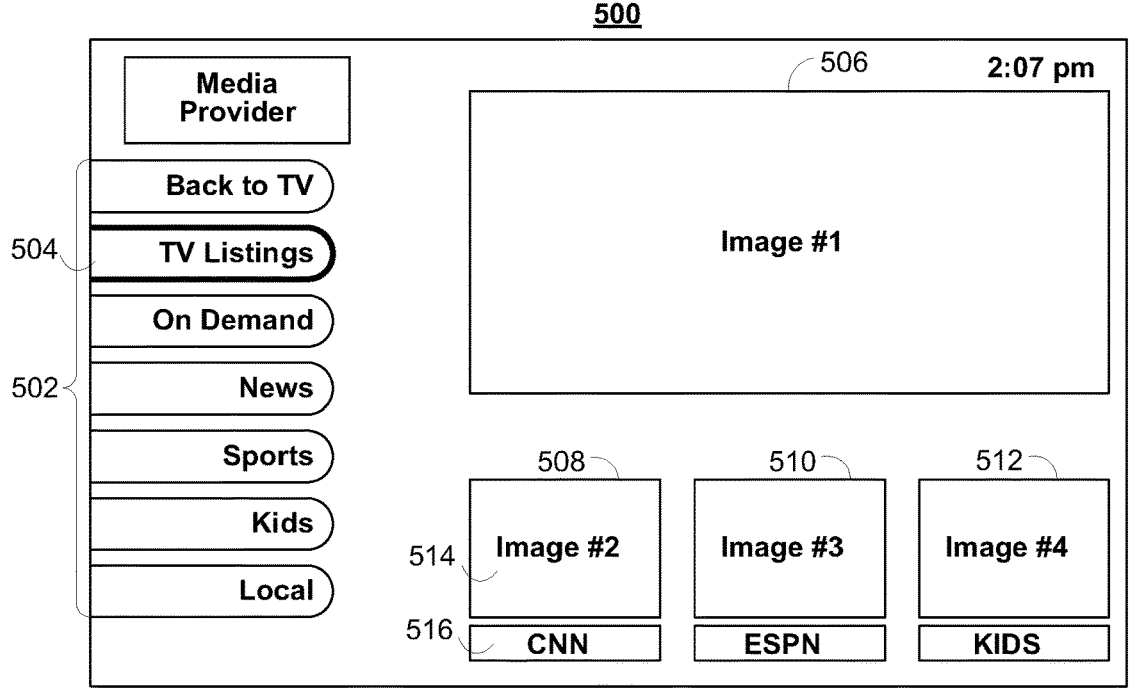
FIG. 5 shows another illustrative example of a media guidance display that may be presented in accordance with some embodiments of the disclosure.

One of the functions of the media guidance application is to provide media guidance data to users. FIGS. 1 and 4-5 show illustrative display screens that may be used to provide media guidance, and in particular media listings. The display screens shown in FIGS. 1 and 4-5 may be implemented on any suitable device or platform. While the displays of FIGS. 1 and 4-5 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 604, discussed further in relation to FIG. 6 below, executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays discussed in relation to FIG. 1, FIG. 4, and FIG. 5. In some implementations, any action performed by control circuitry 604 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

It will be appreciated that while the discussion of media content has focused on video content, the principles of media guidance can be applied to other types of media content, such as music, images, etc.

FIG. 1 shows an illustrative embodiment of a display screen depicting a search application. Device 118 is depicted running a search application, such as a media guidance application running on control circuitry, such as control circuitry 604, discussed further below in relation to FIG. 6. Device 118 is depicted having first previous query 102, first current query 106, second previous query 110, and second current query 114. In some embodiments, the media guidance application may receive a query, such as queries 102, 106, 110, and 114 from a user. In response to receiving queries queries 102, 106, 110, and 114, the media guidance application may generate for display on device 118 the query and may also generate for display a response corresponding to the query, such as response 104 corresponding to first previous query 102, response 106 corresponding to first current query 106, response 112 corresponding to second previous query 110, and response 116 corresponding to second current query 114. In some embodiments, the media guidance application may generate a search query based on pairs of previous queries and current queries and may determine whether to merge or replace the context in a current and previous query. For example, the media guidance application may determine that first previous query 102 and first current query 106 should be a pair because first previous query 102 is received by the media guidance application within a threshold amount of time from the media guidance application receiving first current query 106. In response to determining that first previous query 102 and first current query 106 are a pair, the media guidance application may input first previous query 102 and first current query 106 into a neural network that takes queries as input and outputs a resulting merge or replace operation, such as the neural network depicted and discussed further in relation to in FIG. 3. The media guidance application may, for example, determine that first previous query 102 and first current query 106 relate to a merge operation. Accordingly, the media guidance application may merge first previous query 102 and first current query 106 to generate a search query based off of both queries. The media guidance application may receive search results, such as results 108 based on the merged query generated by the media guidance application.

In another example, the media guidance application may determine that second previous query 110 and second current query 114 relate to a replace operation (e.g., based on inputting second previous query 110 and second current query 114 to the neural network and computing a merge or replace operation). In response to computing a replace operation, based on the neural network, the media guidance application may replace a portion of second previous query 110 with a portion of second current query 114. For example, the media guidance application may replace "Heisenberg" from second previous query 110 with "Jesse" in second current query 114 and may generate search results based on the query generated by the media guidance application (e.g., "Who played Jesse in Breaking Bad?").

In some aspects, the media guidance application may generate a neural network that takes a previous query, such as first previous query 102, and second previous query 110, and a current query, such as first current query 106, and second current query 114, as inputs and output a result indicating a merge or replace operation. The media guidance application may generate a neural network where the neural network comprises a first set of nodes associated with an input layer, such as input nodes 304 and 308 discussed further below in relation to FIG. 3, of the neural network and a second set of nodes associated with an artificial layer of the neural network, such as artificial nodes 312. For example, the media guidance application may generate a neural network to model and predict a user's intention to either merge or replace a portion in a first and second queries. For example, the media guidance application may generate a first set of nodes corresponding to an input layer of the neural network and may associate each node of the neural network with a corresponding word or phrase. The media guidance application may also generate a second set of nodes corresponding to an artificial layer in the neural network, where each node of the second set of nodes is connected to at least one node of the first set of nodes. The media guidance application may utilize the input nodes to represent words in the first and second queries. For example, the media guidance application may map words in the first query and words in the second query to the words associated with nodes in the first set of nodes. The media guidance application may retrieve weights, such as weights 310, associated with the connections between the first set of nodes and the second set of nodes to compute values for the second set of nodes (e.g., by multiplying values in the first set of nodes by the weights and then summing the resultant multiplications). The media guidance application may retrieve the values associated with the nodes in the second set of nodes to determine whether to merge or replace the first and second queries. Because the media guidance application trains the neural network to model whether a query should be merged or replaced based on features, or words, in the queries and then utilizes the training data (e.g., based on the weights between nodes) to train the neural network, the media guidance application is able to predict merge and replace operations for queries that were not already in the training set.

The media guidance application may train the neural network, based on a training data set, to determine weights associated with connections between the first set of nodes and the second set of nodes in the neural network. For example, the media guidance application may retrieve a training data set from memory wherein the training data set comprises a pair including a model current query, such as first current query 106 or second current query 114, and a model previous query, such as first previous query 102 and second previous query 110, and a flag indicating whether the model previous query and model current query should be merged or replaced.

FIG. 2 shows an illustrative embodiment of a set of neural network training data. Table 200 is depicted as having model previous query data 206, model current query data 208 and merge/replace flag 210. Model previous query data 206 may contain listings of previous queries, such as first previous query 102 and second previous query 110. Model current query data 208 may contain a listing of current queries, such as first current query 106 and second current query 114. The training data may associate each previous query with an associated current query. For example, as depicted in FIG. 2 first training data 202 comprises model previous query "What TV shows are on now?" and model current query "How about movies?" First training data is depicted having an associated flag indicating a "Replace" operation stored as merge/replace flag 210. For example, the media guidance application may detect the replace flag in the training data set for first training data 202 because the user may intend for a portion of model previous query, "What TV shows are on now?" to be replaced with model current query "How about movies?" when the user utters the second query. For example, the media guidance application may determine that the user would like to replace "TV shows" from the previous query with "movies" from the current query. The media guidance application may determine that "TV shows" should be replaced by "movies" because the media guidance application may determine that "TV shows" and "movies" are both of a media type (e.g., because during a replace operation the media guidance application determines that the user likely intended to replace a portion in the first query that matches a portion of the second query).

Figure 3:
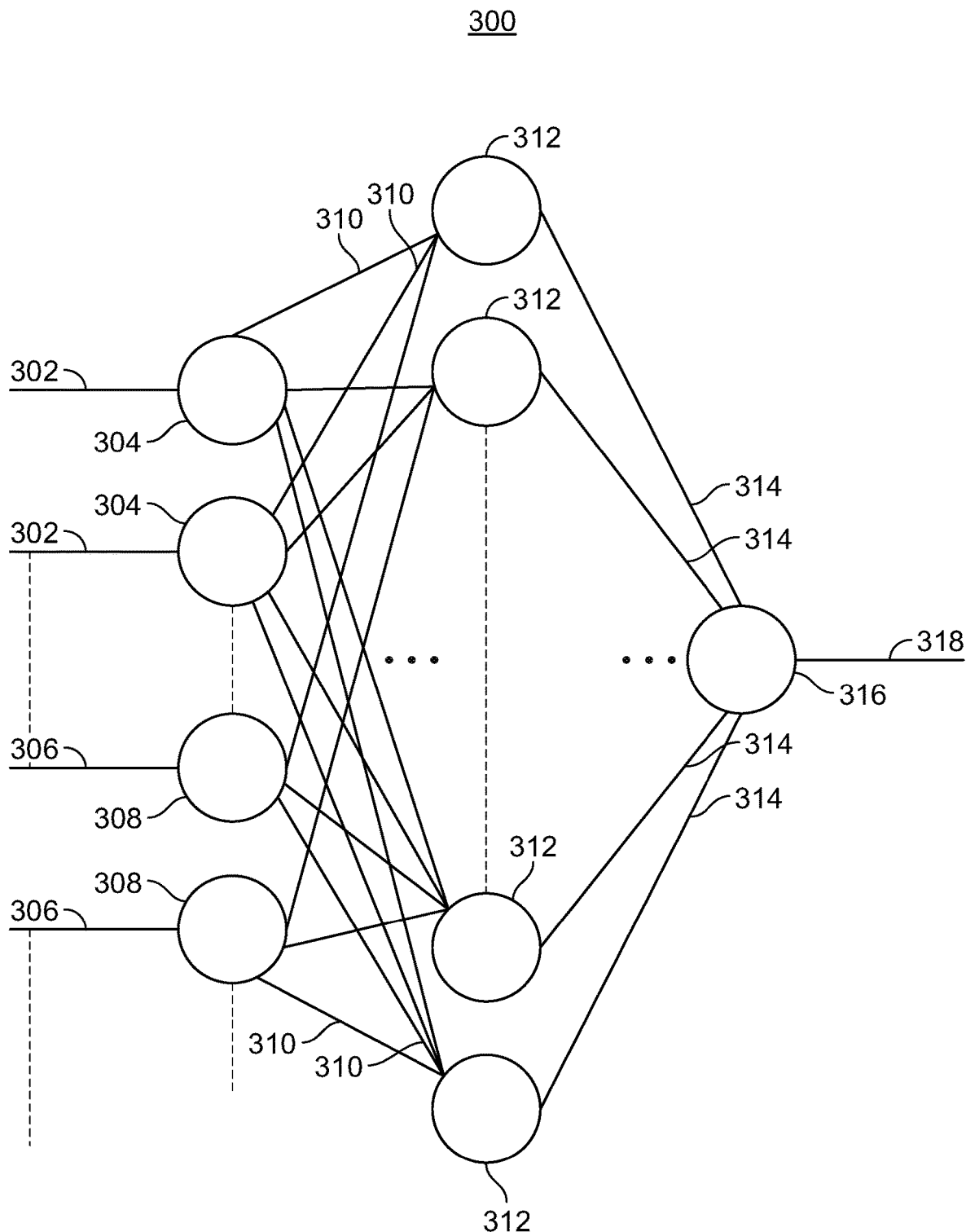
FIG. 3 shows an illustrative artificial neural network in accordance with some embodiments of the disclosure.

FIG. 3 shows an illustrative artificial neural network in accordance with some embodiments of the disclosure. The media guidance application may utilize a neural network such as neural network 300 to determine whether a current query and a previous query should be merged or replaced. Neural network 300 is depicted having features 302 and 306 as inputs to the neural network 300. Features 302 and 306 may include words/tokens of the previous and current query, probabilities of the entity types each token refers to (e.g., "R" may refer to an R rating as well a movie named "R"), graph connections between the various entities, and other suitable features. The features are fed as different inputs 302 and 306 to the network. The features 302 correspond to input nodes 304, and features 306 correspond to input nodes 308. In an example, features 302 are associated with features of the previous query, and features 308 are associated with features of the current query. The network may have one or more hidden layers 312 to then create the output 318 that denotes whether the previous query and the current query should be merged or replaced. Nodes in the hidden layer may be connected to output 318 based on weighted connections such as weights 314. The media guidance application may utilize the weighted connections when determining a value for output 318 based on data in nodes 304, 308 and 312. Nodes 304 and 308 may each correspond to an input layer of neural network 300 and may have a value assigned based on features 302 and 308 that are present in the previous and current queries, respectively (e.g., first previous query 102 and second previous query 110, and first current query 106, and second current query 114).

In some embodiments, all the words and phrases in the previous and current queries are then considered as potential features. Furthermore, the entities in the queries may be replaced by the entity type. For example, "movies with Tom Cruise" may be replaced with "movies with." In this way, a particular example can be representative of a whole class of queries.

In some embodiments, the media guidance application may input the model previous query and the model current query (e.g., the model previous and current query from first training data 202) to nodes of the first set of nodes (e.g., one or more of nodes 304 or 308). For example, the media guidance application may identify features, such as words, in the first query and may map the features in the first query to features associated with nodes in the first set of nodes (e.g., the nodes on the input layer of the neural network, such as nodes 304 and 308). For example, the media guidance application may determine that nodes 304 and 308 are associated with features, such as words. The media guidance application may compare words in the queries to words associated with nodes 304 and 308 to determine whether to map the word (e.g., feature) to the corresponding node.

For example, the media guidance application may map the feature to the node by incrementing a value associated with each node in the first layer that corresponds to a feature in the first query. For example, the media guidance application may increment a value associated with node 304 from 0 to 1 when the media guidance application determines that a feature in the query is associated with node 304. For example, if the media guidance application determines that the query includes the word "movie" and input node 304 is associated with a media feature, the media guidance application may map the word movie to node 304 by incrementing a value associated with node 304 from 0 to 1. Because the media guidance application may compute the values of the second set of nodes (e.g., the values associated with nodes 312) based on multiplying the value of the first set of nodes (e.g., nodes 304 and 308) and weights associated with those nodes (weights 310), the incrementing has the effect of weighting the decision as to whether the query should be merged or replaced. Likewise, the media guidance application may map words in the second query to words associated with nodes in the first set of nodes and may increment a value associated with the mapped nodes. For example, when the media guidance application maps the features of the first query to nodes 304, the media guidance application may map the features of the second query to nodes 308 (e.g., because one subset of nodes of the input layer is associated with inputs for the first query, such as nodes 304, and a second subset of nodes of the input layer is associated with inputs for the second query, such as nodes 308).

In some embodiments, the media guidance application may compute, based on weights, such as weights 310, between the first set of nodes in the input layer (e.g., nodes 304 and 308) and the second set of nodes in the artificial layer (e.g., nodes 312), respective values for each node of the second set of nodes in the artificial layer (e.g., nodes 312). For example, the media guidance application may initialize the weights, such as weights 310, between nodes in the first set of nodes (e.g., nodes 304 and 310) and the second set of nodes (e.g., nodes 314) to one. The media guidance application may compute values for nodes in the second set of nodes 304 or 308 based on multiplying values in the first set of nodes 304 and 308 by the weights 310 connecting nodes in the first set of nodes with nodes in the second set of nodes 312 (e.g., multiply by one for an initial first pass). Because the neural network has weights initialized to an initial value, the neural network will likely miscompute the outcome and will need to iterate thorough multiple calculations to correct an error between the computed outcome and the desired outcome by adjusting the weights in the neural network.

In some embodiments, the media guidance application may compute, based on the respective values for each node in the second set of nodes (e.g., nodes 312) in the artificial layer, a model result indicating a merge or replace operation for the model previous query and the model current query, such as a result at output 318. For example, the media guidance application may multiply the values of the nodes in the input layer by corresponding weights connecting nodes in the input layer with nodes in the artificial layer to compute values for nodes in the artificial layer as described above. The media guidance application may utilize the computed values for nodes in the artificial layer and the weights connecting the nodes in the artificial layer to an output node to compute a resulting merge or replace operation. For example, the media guidance application may initialize the weights of the connections between the nodes in the artificial layer and the output node to one. The system may add up the values of each of the nodes in the artificial layer and may compare the sum to the expected output value (e.g., a value approximately equal to 1 may be equivalent to a merge operation and a value approximately equal to 0 may be equivalent to a replace operation). For example, the media guidance application may normalize the values to a value between one and zero to make the determination whether the value represents a merge or replace operation. For example, the media guidance application may multiply the values of each of the nodes in the artificial layer by their corresponding weight to the output node and may compute a sum of each of the values. The media guidance application may then divide the sum by the number of nodes in the artificial layer to achieve an output result between one and zero. The media guidance application may round the output value to determine whether the output is a merge or replace operation. For example, the media guidance application may determine that a value between 0.499999 and zero indicates a replace operation and a value between 0.5 and 1 indicates a merge operation. These values are just exemplary and any output value may be approximated by the media guidance application to be either a merge or replace operation (e.g., values of 0-5 may correspond to a merge operation and values of 5.1 to 10 may correspond to a replace operation).

In some embodiments, the media guidance application may compare the model result to the flag (e.g., the value at output 318) to determine whether the flag matches the model result, such as the merge/replace result associated with first training data 202. For example, the media guidance application may receive a merge or replace flag from the model training data 202 and may compare the flag to the output value to determine whether the media guidance application accurately computed whether there is a merge or replace operation using the neural network. For example, the media guidance application may determine that, when the output of the neural network does not match the output of the training set, the neural network needs to be updated to better estimate outputs having similar characteristics (e.g., to more accurately predict a merge or replace operation for similar input and output queries). In response to determining that the output does not match the data in first training data 202, the media guidance application updates the weights, such as weights 310 and 314 in neural network 300. Accordingly, the media guidance application may calculate an error value, such as a difference between the value at the output node and the desired output. For example, the media guidance application may compute a value of 0.2 for an exemplary model current and previous query. If the media guidance application determines that the output should be a merge operation (e.g., a value of 1) the media guidance application may determine that the error is 0.8. Therefore the media guidance application may update the weights in the neural network based on a computed error value.

In some embodiments, the media guidance application makes a determination as to what weights to update in the neural network based on a determination that a node in the neural network was active when computing the expected merge or replace operation. For example, the media guidance application may determine whether a node in the neural network has a non-zero value when computing the resulting merge or replace output for the previous and current search query. When the media guidance application determines that the node was active, the media guidance application may update a weight between the active node in a first layer (e.g., input layer) of the neural network and an active node in a second layer of the neural network (e.g., artificial layer). Therefore, the media guidance application will update the weights corresponding to the nodes which actively had an impact on the computation of the resultant merge and replace operation.

In some embodiments, the media guidance application may update the weights associated with the nodes of the neural network based on a first error value in response to determining that the flag does not match the model result. For example, the media guidance application may determine that when the flag does not match the model result, the media guidance application will determine an amount of error between the computed value and the expected value (e.g., the value at the output node and the value indicating the correct merge or replace operation). For example, as described above the media guidance application may determine an error value of 0.8 when the value at the output node is 0.2 and the correct output is a merge operation (e.g., value of 1). The media guidance application may utilize the error value to update the weights in the neural network. For example, the media guidance application may increase particular weights of connections between nodes in the neural network by two, based on determining that the error value was 0.8 (e.g., because an error value of 0.8 may correspond to a correction factor of two in a lookup table accessed by the media guidance application).

In some embodiments, the media guidance application may update the weights such as weights 310 and 314 associated with nodes of the neural network, based on a second error value that is less than the first error value in response to determining that the flag matches the model result. For example, the media guidance application may determine that the value of the output node is 0.9 and the correct output is a merge operation (e.g., value of 1). The media guidance application may compute the difference between the value and the expected output as 0.1. In response to computing the difference, the media guidance application may compute a second error value by which the media guidance application will update the weights, such as weights 310 and 314, in the neural network. For example, the media guidance application may compute the second error value using an exemplary mathematical function such as: second error value=1+the computed difference. The media guidance application may utilize the computed second error value (e.g., 1.1) and may update the weights in the neural network based on the error value (e.g., by multiplying the weights by the second error value). The media guidance application may compute a second error value that is less than the first error value because the media guidance application may determine that because the neural network requires a smaller modification of the weights in the neural network when the value at the output node is close to the correct value.

In some embodiments, the media guidance application may receive, from a user, a first query (e.g., first previous query 102 or second previous query 110) and a second query (e.g., first current query 106 or second current query 114), wherein the first query is received prior to receiving the second query. For example, the media guidance application may access a microphone input and may receive a spoken first query and a spoken second query from a user of the media guidance application. The media guidance application may convert the received first query and second query to a string using a speech-to-text algorithm.

In some embodiments, the media guidance application may receive the first query from the user at a first time and may receive the second query from the user at a second time. The media guidance application may analyze the context between the first query and the second query based on a determination that less than a threshold amount of time has elapsed between the first time and the second time. For example, the media guidance application may determine that the two queries are contextually related when the second query is received shortly after receiving the first query (e.g., within a few minutes or a few seconds).

In some embodiments, the media guidance application may generate a first set of tokens based on terms in the first query and a second set of tokens based on terms in the second query. For example, the media guidance application may utilize a speech-tokenizing algorithm to split the queries into tokens. For example, the media guidance application may split up the query based on words in the query and may generate a different token for each word in the query.

In some embodiments, the media guidance application may generate the tokens based on analyzing the characters in the query. The media guidance application may receive a set of delimiting characters from memory (e.g., a set of characters that typically delimit boundaries between words, such as spaces, hyphens, etc.). The media guidance application may compare the set of delimiting characters to a sequence of characters in the first query to identify a first position of a first character in the first query and a second position of a second character in the first query, each matching a delimiting character of the set of delimiting characters. For example, the media guidance application may determine positions in the string that correspond to spaces. The media guidance application may generate a token of the first query comprising characters of the sequence of characters between the first position and the second position. For example, the media guidance application may generate a token based on the characters between the spaces (e.g., the word between the detected spaces).

In some embodiments, the media guidance application may eliminate tokens associated with filler words from a set of tokens associated with the first and second queries (e.g., because the filler words such as "uh," "like," etc., may not meaningfully contribute to the understanding of the intent of a query using the neural network). For example, the media guidance application may compare the first token to a set of filler words to determine whether the token matches a filler word of the set of filler words. For example, the media guidance application may determine if the token corresponds to a filler word such as "uh." In response to determining that the token corresponds to a filler word, the media guidance application may exclude the token from the set of tokens associated with the first query. In response to determining that the first token does not correspond to a filler word, the media guidance application may add the token to the set of tokens associated with the first query.

The media guidance application may map the first set of tokens and the second set of tokens to the first set of nodes. For example, the media guidance application may identify nodes in the input layer of nodes that correspond to tokens in the first set of tokens and nodes that correspond to tokens in the second set of tokens. For example, the media guidance application may allocate a first subset of nodes of the input layer for the previous query and a second subset of nodes of the input layer with the current query. The media guidance application may compare the tokens of the first query to tokens associated with nodes in the first subset of nodes (e.g., because the first query is received prior to the second query and is therefore the previous query). The media guidance application may compare the tokens of the second query to tokens associated with the second subset of nodes (e.g., because the second query is received after the first query and is therefore the current query).

In some embodiments, in response to matching a token associated with one of the first query and the second query to a token associated with a node in the input layer, the media guidance application may update a value associated with the node. For example, the media guidance application may generate a token "where" for the query "Where is the supermarket?" The media guidance application may compare the token "where" to a plurality of tokens in the input layer of the neural network and may identify a node in the input layer of the neural network associated with the term "where." In response to identifying the node, the media guidance application may increment a value associated with the node. For example, the media guidance application may change a value of the node from 0 to 1 to indicate that a token associated with the node is present in the query. The media guidance application may use the value when computing values for the artificial layer in the neural network based on the weights between the nodes in the input layer and the nodes in the artificial layer.

The media guidance application may determine, using the weights associated with the connections between the first set of nodes and the second set of nodes, a value indicating whether the first query and the second query are associated with a result indicating a merge or replace operation. For example, the media guidance application may utilize values associated with nodes in the input layer of the neural network and may multiply those values with weights connecting nodes in the input layer to corresponding nodes in the artificial layer. For example, the media guidance application may determine that a first node in the input layer is connected to a second node and a third node in the artificial layer. The media guidance application may retrieve a value associated with the first node and may retrieve a first weight associated with the connections between the first node and the second node, and a second weight associated with the first node and the third node. The media guidance application may multiply the value by the first weight to determine a value for the second node. The media guidance application may multiply the value by the second weight to determine a value for the third node. For example, the media guidance application may receive a value associated with the first node of 1 (e.g., because the value indicates that a token associated with the node appears in a query) and may receive a first weight of 0.2 and a second weight of 2 (e.g., because a strength of association between the first node and the second node is less than a strength of association between the first node and the third node). The media guidance application may compute a value for the second node of 0.2 (e.g., 1*0.2) for the second node and may compute a value of 2 for the third node (e.g., 1*2).

The media guidance application may utilize the values of the nodes in the artificial layer to compute an output value indicating a merge or replace operation based on multiplying the values of nodes in the artificial layer with weights associated with the nodes of the artificial layer and the output node. For example, the media guidance application may retrieve a third weight indicating a strength of association between the second node and the output node and a fourth weight indicating a strength of association between the third node and the output node. The media guidance application may multiply the value associated with the second node with the third weight to determine a value associated with the output node. For example, the media guidance application may receive a third weight of 0.5 out of 2 indicating a medium-low strength of association between the output node and the second node. The media guidance application may compute an intermediate output value of 0.1 by multiplying the value of the second node (e.g., 0.2 with the third weight 0.5). The media guidance application may add the intermediate output value with a second intermediate output value based on the fourth weight (e.g., 0.1) and the third node. For example, the media guidance application may compute the second intermediate output value based on multiplying the fourth weight (e.g., 0.1) with the value associated with the third node (e.g., 2) to compute a second intermediate output value of 0.4 (e.g., 2*0.2). The media guidance application may sum the first intermediate output value with the second intermediate output value to achieve an output value of 0.5.

In some embodiments, the media guidance application may normalize the output value to fall within a range of values. For example, the media guidance application may determine a maximum possible output value and a minimum possible output value. For example, the media guidance application may determine that a maximum possible output value for the exemplary neural network is 8, based on setting all values in the neural network to their maximum value (e.g., 1 for the input layer and 2 for the weight between nodes) and may compute the output when the values associated with the nodes are assigned, by the media guidance application, their maximum value. The media guidance application may also compute a minimum value based on setting all values of the input layer to their minimum value (e.g., 0) and then multiplying each of the nodes by the minimum weight (e.g., 0). Based on the computation, the media guidance application may determine that the range of output values associated with the neural network is 0-8. Accordingly, when the media guidance application outputs a value from the neural network, the media guidance application may normalize the value based on the determined range. For example, the media guidance application may normalize the output value to a 0-1 scale by dividing the output value of the neural network by 8 (e.g., because the output is between a 0-8 scale and dividing by 8 condenses the scale to 0-1). Alternatively the media guidance application may multiply the output value to expand a range of values. For example, the media guidance application may expand the range to 0-80 by multiplying the output value of the neural network by 10.

The media guidance application may compare the value to a threshold value to determine whether the value at the output node indicates a merge or replace operation. For example, the media guidance application may determine that, after normalization, merge operations correspond to an output value between 0 and 0.5 and that replace operations correspond to an output value between 0.51 and 1. Therefore, the media guidance application may determine that for an output value of 0.4 the operation is a merge, but for an output value of 0.9 the operation is a replace.

In response to determining, based on the output value, that the operation is a merge operation, the media guidance application may merge the first query and the second query. For example, the media guidance application may generate a search query based on merging tokens from the first query with tokens from the second query. For example, if the first query is "Find me somewhere to eat" and the second query is "Heathy food!" the media guidance application may generate a search query of "Find me somewhere to eat heathy food" based on merging the words from the first query and the words in the second query to generate the search query. For example, the media guidance application may merge the first query and the second query to maintain or narrow a context associated with the first query (e.g., by adding terms to a search query from the second query to the first query).

The media guidance application may utilize the merged search query to identify search results associated with the merged search query. For example, the media guidance application may retrieve search results for healthy places to eat when searching a restaurant database with the query "Find me somewhere to eat healthy food."

In response to determining, based on the value, that the first query and the second query are associated with a result indicating a replace operation, the media guidance application may replace a portion of the first query with a portion of the second query to generate a search query. For example, the media guidance application may replace the portion of the first query with a portion of the second query to change the context of the first query from a first context to a second context. For example, the media guidance application may identify a portion of the first query that corresponds to a portion of the second query and may replace the portion of the first query with the portion of the second query. For example, the media guidance application may determine that when the first query is "What movies are on tonight?" and the second query is "How about TV shows?" that the user is trying to modify a context of the query (e.g., based on the analysis by the neural network as described above). For example, the media guidance application may compare tokens in the first query to tokens in the second query to identify types associated with each of the tokens. The media guidance application may identify types for the tokens associated with the first query. For example, the media guidance application may determine that the token "movies" is associated with a media type (e.g., because movies are media) and the token "tonight" is associated with a time type (e.g., because tonight indicates a time). The media guidance application may identify types associated with the tokens of the second query. For example, the media guidance application may determine that the token "TV shows" is associated with a media type (e.g., because TV shows are media). The media guidance application may determine that the media guidance application should replace the token "movies" in the first query with the token "TV shows" from the second query because the two tokens are of the same type. The media guidance application may replace tokens of the same type to change the context from a first context to a second context but maintain the structure of the query (e.g., when a user is requesting media it changes the context of what media is being searched but does not change the scope of the query).

In some embodiments, the media guidance application may identify the types associated with tokens by inputting the token to a knowledge graph and identifying a type associated with the token based on an output from the knowledge graph. For example, the media guidance application may input a token of "movies" into the knowledge graph and may receive a type of "media" because "movies" may be categorized in the knowledge graph as having a strongest type of media. In another example, the word "Beethoven" may return a type "dog", "composer" and "media" because the word "Beethoven" may correspond to Beethoven the famous dog, Beethoven the classical composer, or "Beethoven" the movie.

In some embodiments, the media guidance application may generate for display search results corresponding to a search query generated based on replacing the first portion of the first query with the second portion of the second query. For example, the media guidance application may replace a first portion of the first query with a second portion of a second query as described above to generate a search query. The media guidance application may transmit the query to a search database to retrieve search results associated with the query. For example, the media guidance application may generate a search query "What TV shows are on tonight?" based on replacing "movies" in the first query with "TV shows" from the second query. The media guidance application may search a media database for television shows that are on that evening and may generate for display listings corresponding to the search results.

It should be noted the systems and/or methods described above may be applied to, or used in accordance with, other systems, methods and/or apparatuses.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 424. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 424 may allow the user to access different types of content, media guidance application displays, and/or media guidance application features. Options region 424 may be part of display 400 (and other display screens described herein), or may be invoked by a user by selecting an on-screen option or pressing a dedicated or assignable button on a user input device. The selectable options within options region 424 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
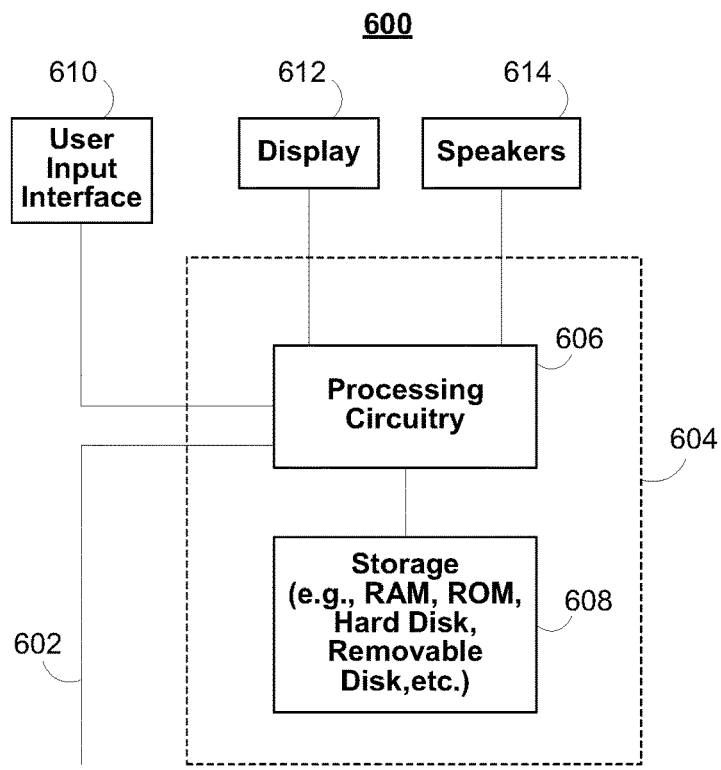
FIG. 6 is a block diagram of an illustrative user equipment device in accordance with some embodiments of the disclosure.
Figure 7:
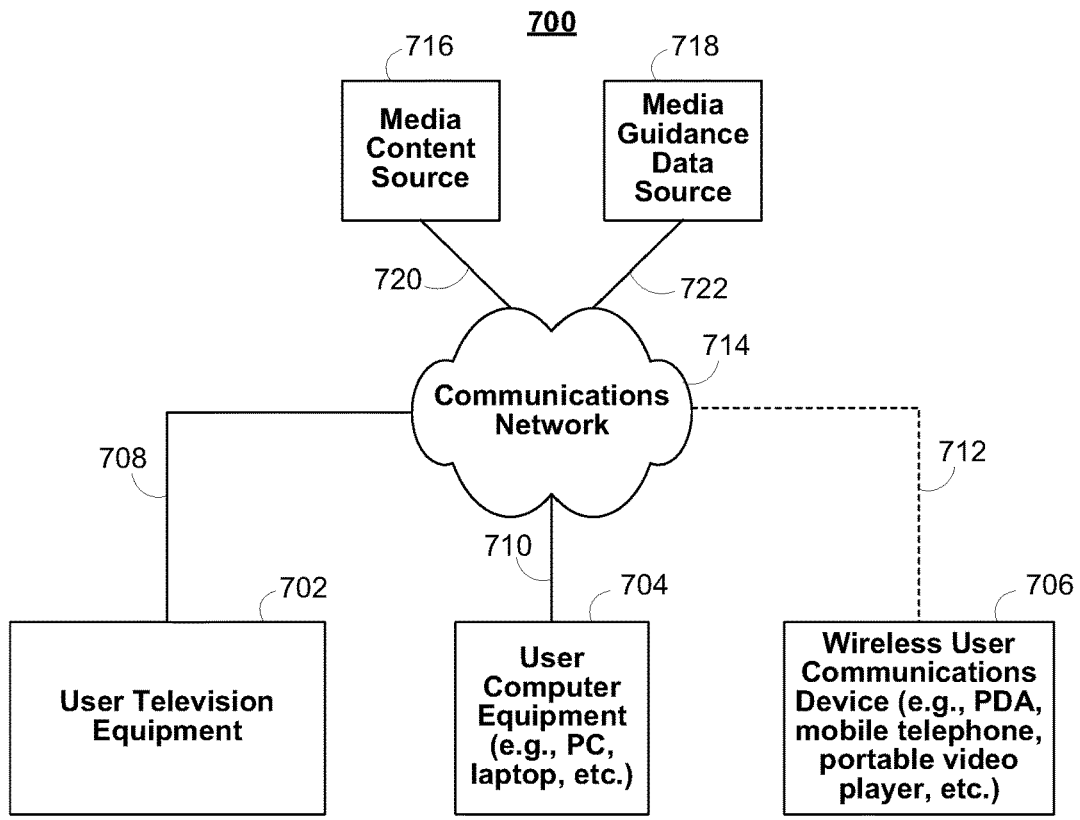
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively.

Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data.

For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
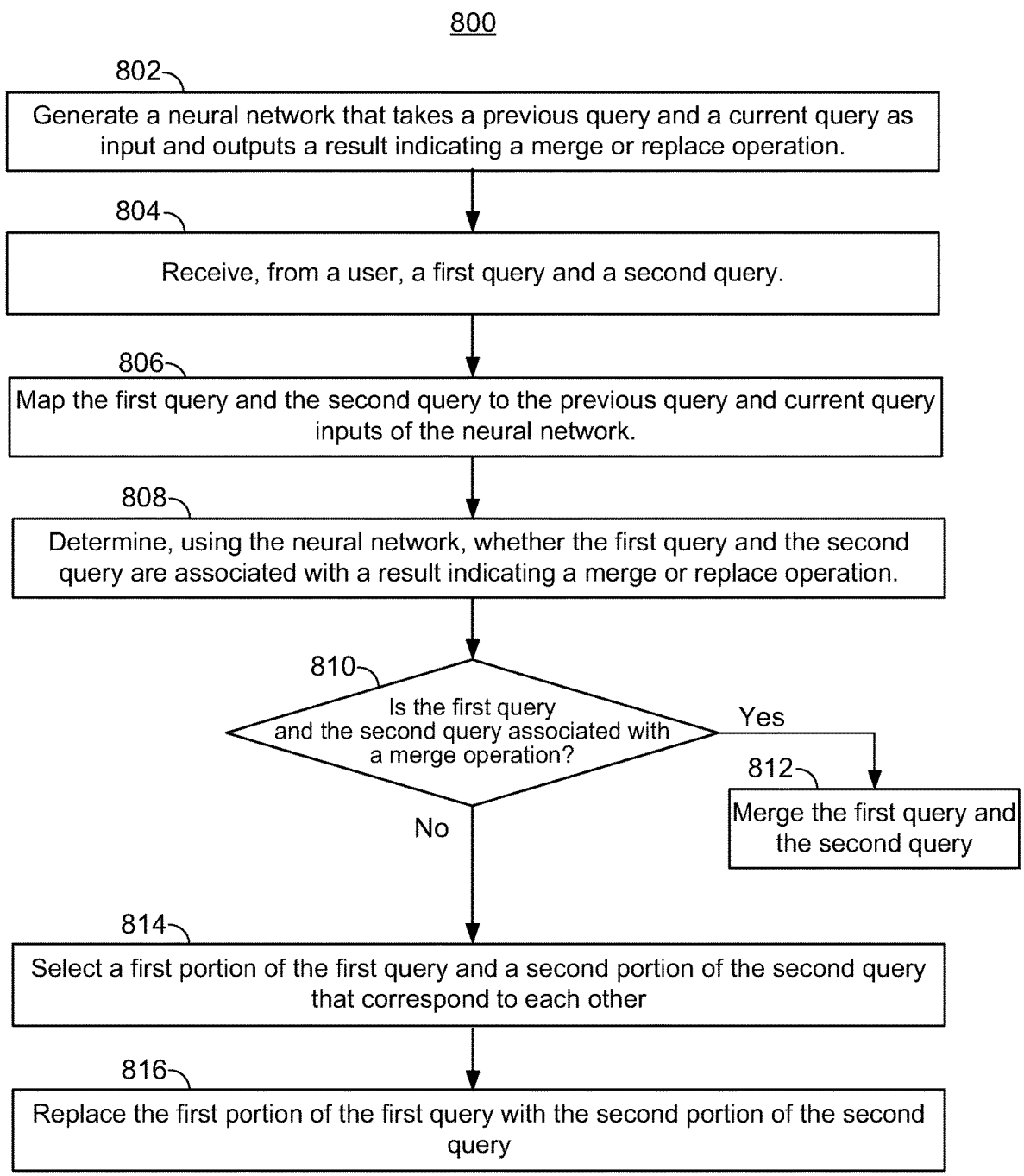
FIG. 8 depicts an illustrative process for determining whether to merge or replace a current and a previous search query, in accordance with some embodiments of the disclosure.

FIG. 8 is a flowchart of illustrative steps for generating a neural network that takes a previous query and a current query as input and outputs a result indicating a merge or replace operation, in accordance with some embodiments of the disclosure. For example, a media guidance application implementing process 800 may be executed by control circuitry 604. In some embodiments, instructions for executing process 800 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 1 and 6-7.

Process 800 begins at 802, where the media guidance application running on control circuitry 604 generates a neural network that takes a previous query and a current query as input and outputs a result indicating a merge or replace operation. For example, control circuitry 604 may generate a neural network such as neural network 300 described above with respect to FIG. 3. Control circuitry 604 may allocate space for neural network 300 on storage 608 and may store values, such as weights 310 and 314 and data associated with nodes 304, 308, 312 and 318 in storage 608. For example, control circuitry 604 may store a node in storage 308 by generating an array for the node comprising fields including pointers to other nodes connected to said node in the neural network, weights of those connections, and any other data associated with the node, such as a value, feature associated with the node, etc. When control circuitry 604 computes an output from neural network 300, control circuitry 604 may retrieve data associated with nodes from specific layers of the neural network in parallel, for example, control circuitry 604 and may compute values for a next layer in parallel. For example, control circuitry 604 may comprise 4 or more processors or pipelines. Control circuitry 604 may retrieve the data associated with both of nodes 304 and both of nodes 308 in parallel from storage 608 and may compute values for nodes 312 in parallel based on the retrieved values from nodes 304 and 308 and their corresponding weights 310.

At 804, control circuitry 604 receives, from a user, a first query and a second query. For example, control circuitry 604 may receive a first query, such as first previous query 102 and second previous query 110, and a second query, such as first current query 106 and second current query 114, from user input interface 610. For example, control circuitry 604 may access, via user input interface 610, a microphone input for receiving verbal inputs from a user and may convert the verbal inputs to a string of characters using a voice-to-text algorithm. In another example, control circuitry 604 may access user input interface 610 to access a touch screen or keyboard input of a device, such as equipment 118.

At 806, control circuitry 604 maps the first query and the second query to the previous query and the current query inputs of the neural network. For example, control circuitry 604 may identify features in the first query and features in the second query, e.g., by tokenizing the first query and the second query, and may compare the tokens to tokens associated with nodes 304 and 308 to determine whether tokens of the first or second query match nodes associated with nodes 304 and 308. When control circuitry 604 determines that a token associated with one of the first and second queries matches a token associated with one of node 304 or node 308, control circuitry 604 may increment a value associated with the node. For example, control circuitry 604 may generate tokens of the query "What is the weather like in New York?" such as "What is" "weather" and "New York". Control circuitry 604 may match the "New York" token with a "places" token associated with node 304 of neural network 300 (e.g., based on data from the knowledge graph indicating that New York is a location). In response to matching the "New York" token with the place token, control circuitry 604 may increment a value associated with node 304. For example, control circuitry 604 may increment a value of node 304 from 1 to 2 to indicate that a token from the query matched the token associated with node 304.

At 808, control circuitry 604 determines, using the neural network, whether the first query and the second query are associated with a result indicating a merge or replace operation. For example, as described above, control circuitry 604 may retrieve data associated with neural network 300 from storage 308. Control circuitry 604 may utilize the values stored in relation to the nodes and the weights connecting nodes in the query to generate an output value at output node 318. An exemplary process for generating an output value at output node 318 is discussed further below, in relation to FIG. 12.

At 810, control circuitry 604 determines whether the first query and the second query are associated with a merge operation. If control circuitry 604 determines that the first query and the second query are associated with a merge operation (e.g., when control circuitry 604 maps the first query and the second query to nodes 304 and 308 at neural network 300 and receives an output at output 318 indicating a merge operation), control circuitry 604 proceeds to 812. Otherwise, control circuitry 604 proceeds to 814.

At 812, control circuitry 604 merges the first query and the second query. For example, control circuitry 604 may receive a first query "Where is the nearest pizza shop?" and a second query "one with at least 4 stars" and control circuitry 604 may generate a merged query such as "Where is the nearest pizza shop with at least 4 stars?" Control circuitry 604 may exclude "one" from the second query when merging the first query and the second query based on a determination that the "one" refers to the subject of the previous query. For example, control circuitry 604 may determine that "one" refers to a pizza shop based on applying a syntactic analysis on the first query and the second query and may exclude "one" in response to determining that it would be redundant to include that word in the merged query (e.g., because based on the syntax analysis control circuitry 604 determines that "one" and "pizza shop" refer to the same thing).

At 814, control circuitry 604 selects a first portion of the first query and a second portion of the second query that correspond to each other. For example, in response to determining a replace operation based on the first query and the second query, control circuitry 604 may identify a portion of the first query that matches a portion of the second query and may replace the portion of the first query with the portion of the second query. For example, control circuitry 604 may apply a semantic analysis on the first query and the second query as described above. In an example, control circuitry 604 may identify a subject of the first query and a subject of the second query and may replace the subject of the first query with the subject of the second query in response to determining that a change in intent is desired by the user (e.g., based on the neural network output).

At 816, control circuitry 604 replaces the first portion of the first query with the second portion of the second query. For example, control circuitry 604 may identify the first portion and the second portion as described above with respect to 814. For example, control circuitry 604 may receive a first query such as "Who played Batman?" and a second query such as "How about Spiderman?" Control circuitry 604 may analyze the first query and the second query and may determine that Batman corresponds to Spiderman (e.g., based on a connection between Spiderman and Batman in a knowledge graph). Accordingly, control circuitry 604 may generate a query such as "Who played Spiderman?" and may utilize the query to perform a search for results matching "Who played Spiderman?" such as Tobey Maguire, the actor in "Spiderman 3."

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 1 and 6-7 could be used to implement one or more portions of the process.

Figure 9:
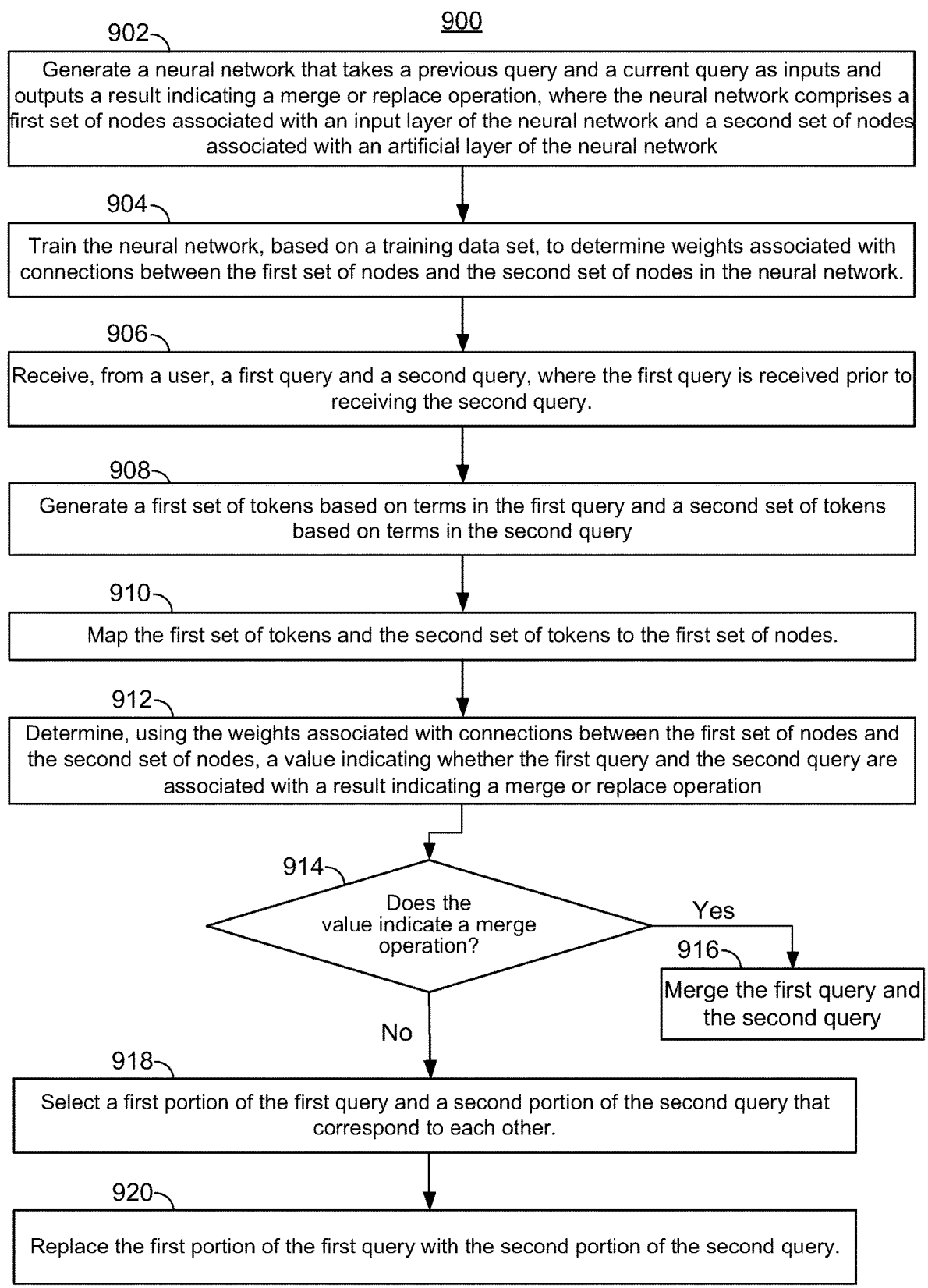
FIG. 9 depicts another illustrative process for determining whether to merge or replace a current and a previous search query, in accordance with some embodiments of the disclosure.

FIG. 9 is a flowchart of illustrative steps for alerting a user to segments of media that were previously missed by the user, in accordance with some embodiments of the disclosure. For example, a media guidance application implementing process 900 may be executed by control circuitry 604. In some embodiments, instructions for executing process 900 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 1 and 6-7.

Process 900 begins at 902, where the media guidance application running on control circuitry, such as control circuitry 604, generates a neural network that takes a previous query and a current query as inputs and outputs a result indicating a merge or replace operation, where the neural network comprises a first set of nodes associated with an input layer of the neural network and a second set of nodes associated with an artificial layer of the neural network. For example, control circuitry 604 may generate a neural network such as neural network 300 comprising nodes 304 and 308 in an input layer of the neural network and nodes 312 in an artificial layer of the neural network. An exemplary process for generating the neural network is discussed above in relation to 802 of process 800.

At 904, control circuitry 604 trains the neural network, based on a training data set, to determine weights associated with connections between the first set of nodes (e.g., nodes 304 and 308) and the second set of nodes (e.g., nodes 312) in the neural network. For example, control circuitry 604 may receive a training data set such as the data set depicted in FIG. 2. For example, control circuitry 604 may receive a model previous query and a model current query from the training data set and may map the model previous query and the model current query to inputs of the neural network. Control circuitry 604 may compute an output at output 318 and may compare the output to the replace/merge flag associated with the training data set. In response to determining that there is a large error, (e.g., the output at node 318 differs from the merge/replace flag by greater than a threshold amount), control circuitry 604 may update the weights, such as weights 310 and 314, based on the error value so that future computations by the neural network are more accurate.

At 906, control circuitry 604 receives from a user a first query and a second query, where the first query is received prior to receiving the second query. For example, control circuitry 604 may receive a first query before receiving the second query and may therefore associated with first query with the previous query input of the neural network and may associate the second query with the current query input of the neural network. An exemplary process for receiving user input is discussed further in relation to 804 of process 800.

At 908, control circuitry 604 generates a first set of tokens based on terms in the first query and a second set of tokens based on terms in the second query. For example, control circuitry 604 may perform a tokenization algorithm on the first and the second query to generate a first set of tokens associated with the first query and a second set of tokens associated with the second query. An additional process for generating tokens for the first query and the second query is discussed further in relation to FIG. 10.

At 910, control circuitry 604 maps the first set of tokens and the second set of tokens to the first set of nodes. For example, control circuitry 604 may generate the first and second set of tokens as discussed above. Control circuitry 604 may compare tokens in the first set of tokens with tokens or features associated with nodes on an input layer of the neural network, such as nodes 304 and 308 of neural network 300. When control circuitry 604 determines that a token of the first or second set of tokens matches a token or feature associated with a node of the neural network, control circuitry 604 will map the token to the node by, for example, incrementing a value associated with the node.

At 912, control circuitry 604 determines, using the weights associated with connections between the first set of nodes and the second set of nodes, a value indicating whether the first query and the second query are associated with a result indicating a merge or replace operation. An exemplary process for generating an output value at output node 318 indicating a merge or replace operation for a current and previous query is discussed further below, in relation to FIG. 12.

At 914, control circuitry 604 determines whether the value (e.g., the value output by node 318 of the neural network) indicates a merge operation. For example, node 318 may output a value between 1 and 10 to indicate whether the queries are associated with a merge or replace operation. For example, control circuitry 604 may retrieve a range of values of output 318 corresponding to a merge indication, such as a range between 1 and 5 and may receive a threshold range for of values of output 318 corresponding to a replace indication, such as a range of 6-10. For example, when control circuitry 604 computes a value of 3 at output 318, control circuitry 604 may determine that the queries should be merged (e.g., because 3 is within the range of 1-5).

In this example, control circuitry 604 proceeds to 916 when output 318 is within 1-5 and proceeds to 918 when output 318 is within 6-10.

At 916, control circuitry 604 merges the first query and the second query. An exemplary process for merging the first query is discussed in relation to 812 of process 800.

At 918, control circuitry 604 selects a first portion of the first query ad a second portion of the second query that correspond to each other. An exemplary process for selecting the first portion of the first query and the second portion of the second query is discussed in relation to 814 of process 800.

At 920, control circuitry 604 replaces the first portion of the first query with the second portion of the second query. An exemplary process for replacing a portion of the first query with a portion of the second query is discussed in relation to 816 of process 800.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 1, 6-7 could be used to implement one or more portions of the process.

Figure 10:
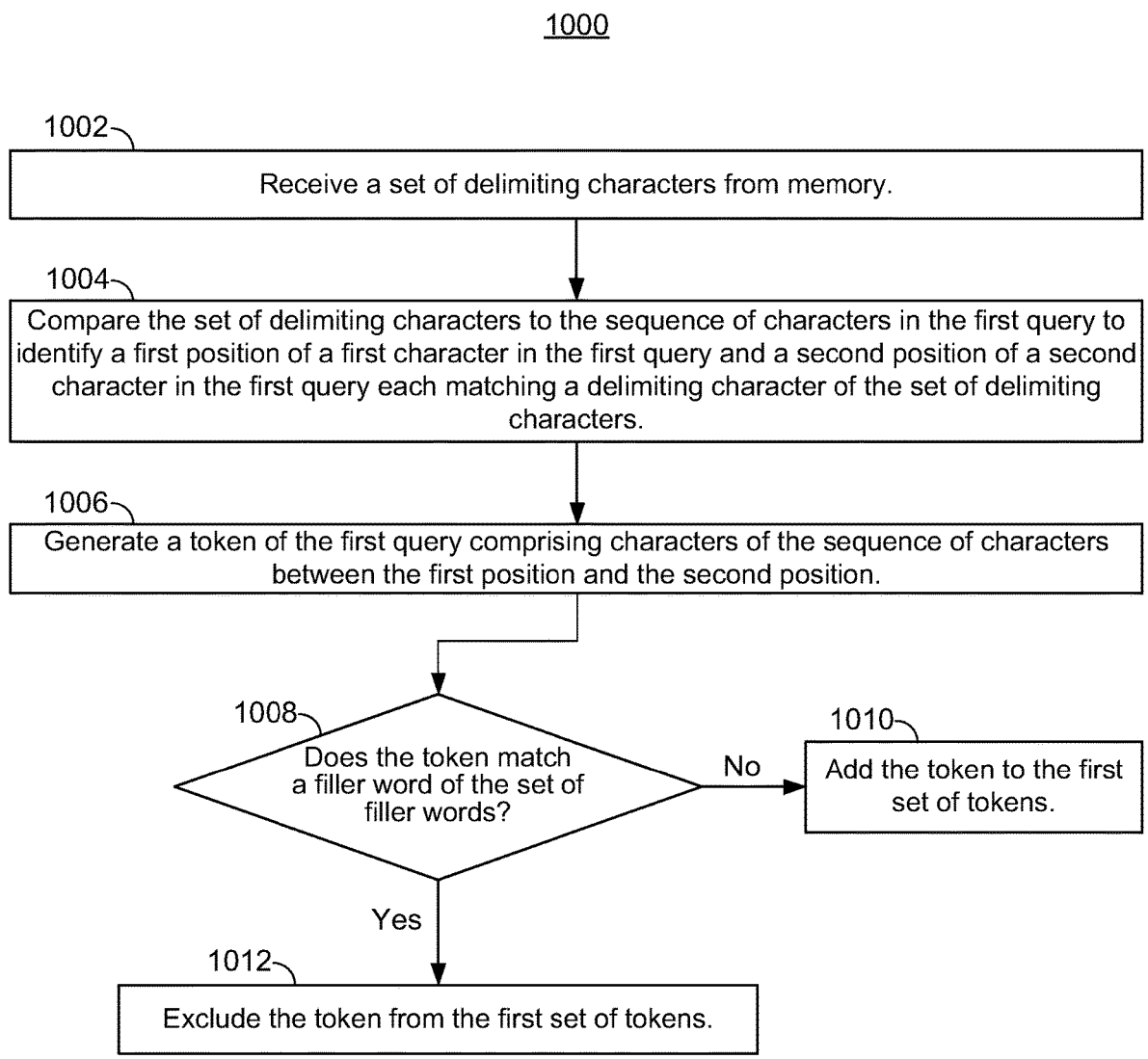
FIG. 10 depicts an illustrative process for tokenizing a search query, in accordance with some embodiments of the disclosure.

FIG. 10 is a flowchart of illustrative steps for tokenizing a query in accordance with some embodiments of the disclosure. For example, a media guidance application implementing process 1000. For example, a media guidance application implementing process 1000 may be executed by control circuitry 604. In some embodiments, instructions for executing process 1000 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 1 and 6-7.

Process 1000 begins at 1002, where control circuitry 604 receives a set of delimiting characters from memory. For example, control circuitry 604 may retrieve a set of delimiting characters such as commas, spaces, hyphens, in an array from storage 308.

At 1004, control circuitry 604 compares the set of delimiting characters to the sequence of characters in the first query to identify a first position of a first character in the first query and a second position of a second character in the first query each matching a delimiting character of the set of delimiting characters. For example, control circuitry 604 may receive the query "When is 'The Godfather' on?" and may identify delimiting characters (e.g., 'marks) before "the" and after "Godfather."

At 1006, control circuitry 604 generates a token of the first query comprising characters of the sequence of characters between the first position and the second position. For example, control circuitry 604 may generate a token "The Godfather" based on the identified position of the two ' characters identified at 1004 by control circuitry 604.

At 1008, control circuitry 604 determines whether the token matches a filler word of the set of filler words. For example, control circuitry 604 may compare the token to a database, such as a database stored on storage 308, indicating filler words such as "uh", "like", etc. If control circuitry 604 determines that the token matches a word in the database of filler words, control circuitry 604 proceeds to 1012 where control circuitry 604 excludes the token from the first set of tokens (e.g., because the token provides little value for ascertaining whether control circuitry 604 should perform a merge or replace operation). If control circuitry 604 determines that the token does not match a filler word in the database of filler words, control circuitry 604 proceeds to 1010 where control circuitry 604 adds the token to the first set of tokens associated with the first query. For example, control circuitry 604 adds the token to the set of tokens because it may be relevant for determining, using neural network 300, whether control circuitry 604 should perform a merge or replace operation.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 1 and 6-7 could be used to implement one or more portions of the process.

Figure 11:
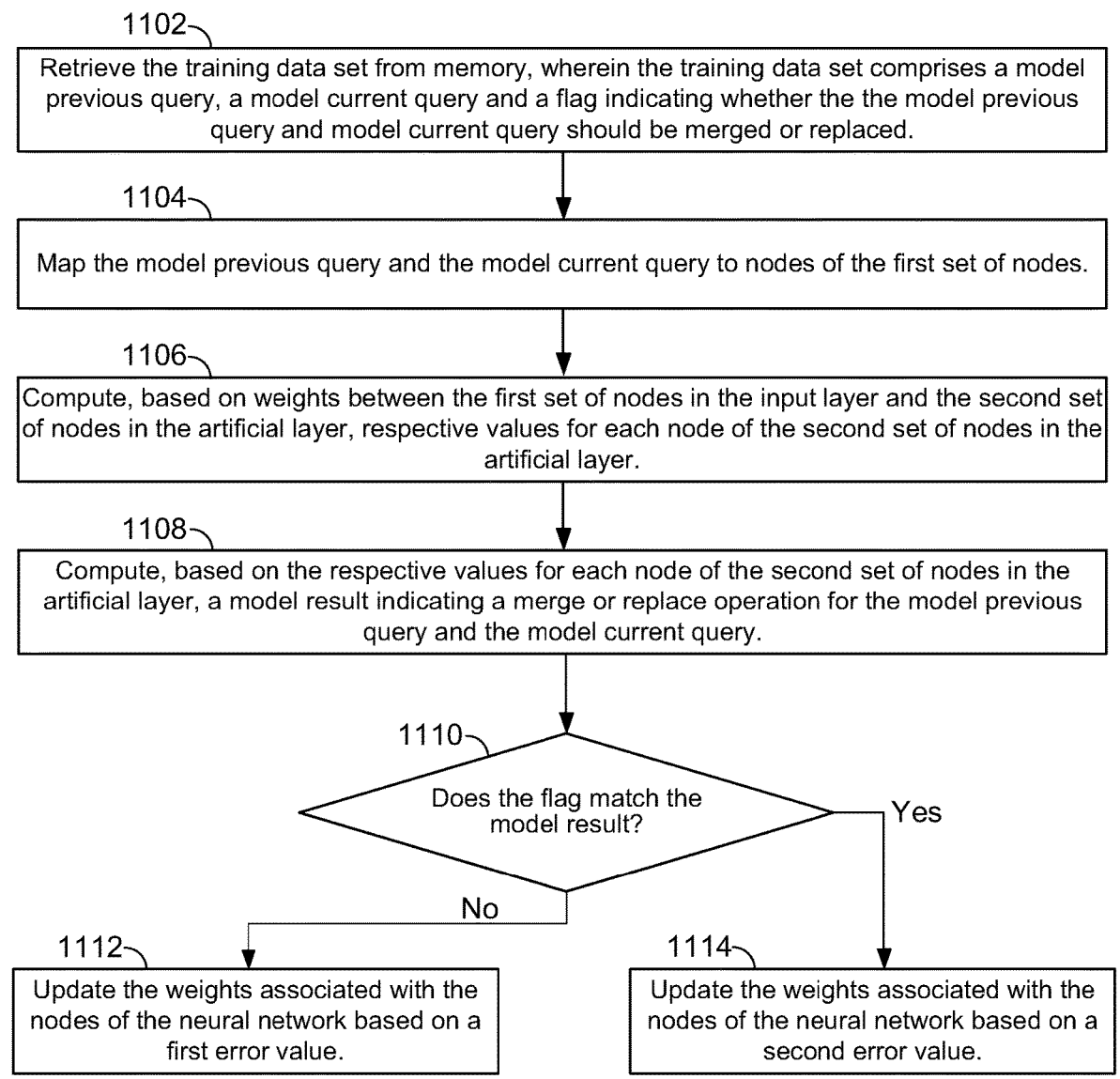
FIG. 11 depicts an illustrative process for training a neural network, in accordance with some embodiments of the disclosure.

FIG. 11 is a flowchart of illustrative steps for training a neural network, such as neural network 300, in accordance with some embodiments of the disclosure. For example, a media guidance application implementing process 1100 may be executed by control circuitry 604. In some embodiments, instructions for executing process 1100 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 1 and 6-7.

Process 1100 begins at 1102, where the media guidance application running on control circuitry 604 retrieves the training data set from memory (e.g., the training data set depicted in FIG. 2), wherein the training data set comprises a model previous query, a model current query and a flag indicating whether the model previous query and model current query should be merged or replaced. For example, as discussed above, control circuitry 604 may retrieve from storage 308 a training data set for training the neural network based on a set of pairs of previous and current queries having an associated merge or replace flag.

At 1104, control circuitry 604 maps the model previous query and the model current query to nodes of the first set of nodes. For example, control circuitry 604 maps the model previous query and the model current query by generating a set of tokens for the model previous and current queries (as described in relation to process 1000) and inputting the queries to the neural network, as described in relation to 806 of process 800 or 910 of process 900.

At 1106, control circuitry 604 computes, based on weights between the first set of nodes in the input layer and the second set of nodes in the artificial layer, respective values for each node of the second set of nodes in the artificial layer. For example, control circuitry 604 may compute values for nodes 312 based on multiplying values associated with nodes 304 and 308 with their corresponding weights connecting nodes from the input layer (e.g., nodes 304 and 308) with nodes of the artificial layer (e.g., 312).

At 1108, control circuitry 604 computes, based on the respective values for each node of the second set of nodes in the artificial layer, a model result indicating a merge or replace operation for the model previous query and the model current query. For example, control circuitry 604 may multiply the values associated with nodes 312 with the weights 314 and may sum the values for computing a value associated with output node 316. Control circuitry 604 may identify a value for output 318 (e.g., a value indicating merge or replace operation) based on comparing the value of output node 316 to a threshold range of values and determining whether the value falls within a range for a merge operation or a replace operation.

At 1110, control circuitry 604 determines whether the flag matches the model result. If control circuitry 604 determines that the flag matches the model result (e.g., if control circuitry 604 determines that the output of the neural network matches the model merge or replace flag in the training data), control circuitry 604 proceeds to 1114. Otherwise, control circuitry 604 proceeds to 1112.

At 1112, control circuitry 604 updates the weights associated with the nodes of the neural network based on a first error value. For example, control circuitry 604 may determine a first error value based on a difference between the output of the neural network and the merge/replace flag in the training data. For example, control circuitry 604 may determine that the output of the neural network is 0.3 but the flag in the training data indicates that the output should be 1. Control circuitry 604 may compute an error value of 0.7 and may use the error value of 0.7 to determine a degree to which weights 310 and 314 are updated by control circuitry 604.

At 1114, control circuitry 604 updates the weights associated with the nodes of the neural network based on a second error value. In some embodiments, the error value will be zero or a value less than the first error value because control circuitry 604 may determine that when the neural network computes the correct value, that no update to the weights by control circuitry 604 is required.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 1 and 6-7 could be used to implement one or more portions of the process.

Figure 12:
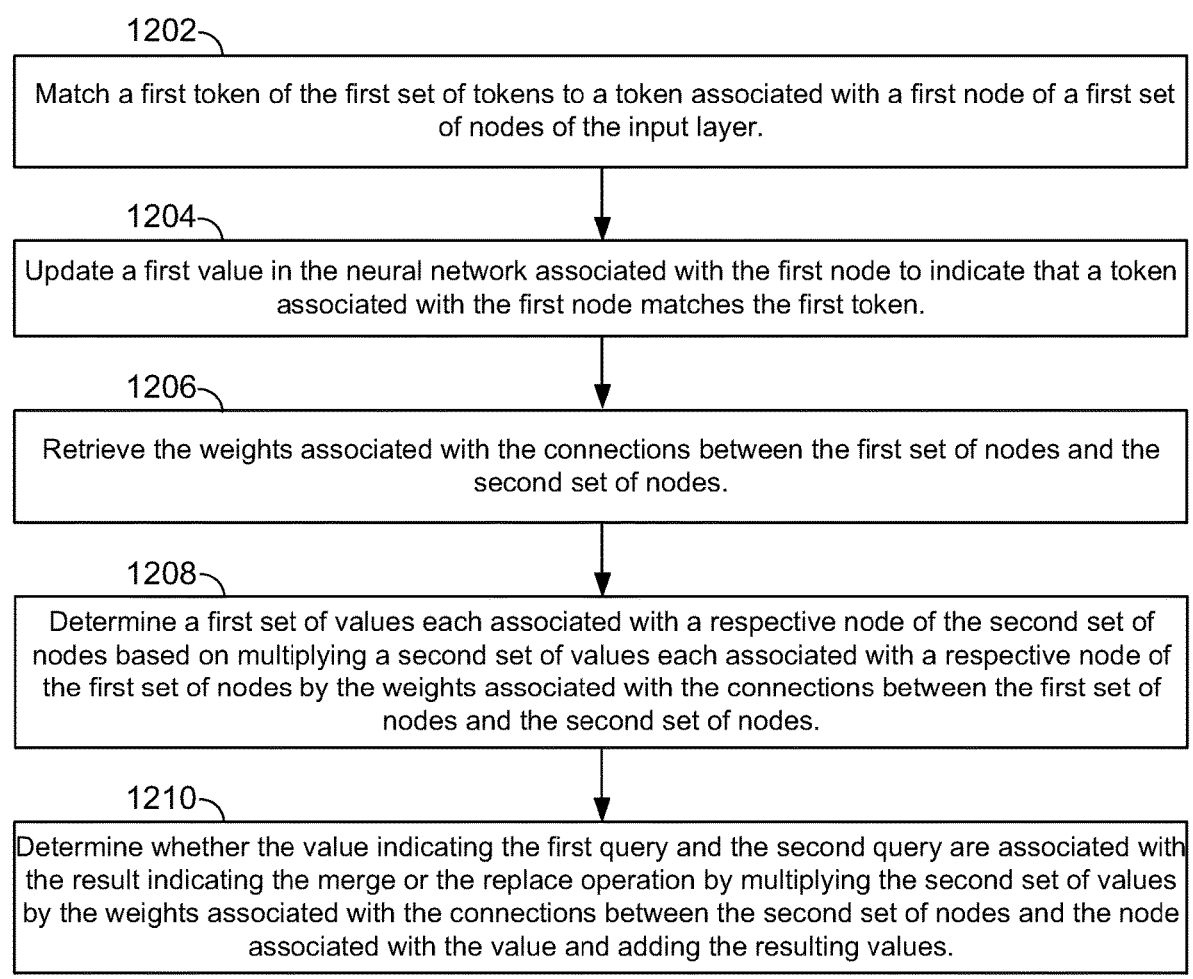
FIG. 12 depicts an illustrative process for computing an output from the neural network, in accordance with some embodiments of the disclosure.

FIG. 12 is a flowchart of illustrative steps for computing an output from the neural network, such as neural network 300, in accordance with some embodiments of the disclosure. For example, a media guidance application implementing process 1200 may be executed by control circuitry 604. In some embodiments, instructions for executing process 1200 may be encoded onto a non-transitory storage medium (e.g., storage 608) as a set of instructions to be decoded and executed by processing circuitry (e.g., processing circuitry 606). Processing circuitry may, in turn, provide instructions to other sub-circuits contained within control circuitry 604, such as the tuning, video generating, encoding, decoding, encrypting, decrypting, scaling, analog/digital conversion circuitry, and the like. It should be noted that process 1200, or any step thereof, could be performed on, or provided by, any of the devices shown in FIGS. 1 and 6-7.

Process 1200 begins at 1202, where the media guidance application running on control circuitry 604 matches a first token of the first set of tokens to a token associated with a first node of a first set of nodes of the input layer. For example, control circuitry 604 may retrieve a first query "Where can I buy bacon?" Control circuitry 604 may generate tokens associated with the words "Where" "buy" and "bacon" as discussed above in relation to process 1000. Control circuitry 604 may compare, for example, the token bacon to tokens associated with the input layer of the neural network. For example, control circuitry 604 may compare the token "bacon" to features or tokens associated with nodes 304 and 308 in the input layer. Control circuitry 604 may determine that "bacon" matches a node associated with a food feature and may accordingly update a value associated with the node.

At 1204, control circuitry 604 updates a first value in the neural network associated with the first node to indicate that a token associated with the first node matches the first token. For example, control circuitry 604 may increment a value associated with the node by 1 to indicate that control circuitry 604 identified a token of the first query that matches the feature of the node.

At 1206, control circuitry 604 retrieves the weights associated with the connections between the first set of nodes and the second set of nodes. For example, control circuitry 604 may retrieve weights 310 associated with the connections between nodes 304 and 308 and nodes 312.

At 1208, control circuitry 604 determines a first set of values, each associated with a respective node of the second set of nodes, based on multiplying a second set of values, each associated with a respective node of the first set of nodes, by the weights associated with the connections between the first set of nodes and the second set of nodes. For example, control circuitry 604 may multiply the values associated with nodes 304 and 308 with a corresponding weight for a connection between one of nodes 304 and 308 and one of nodes 312. Control circuitry 604 may iterate though each of nodes 304 and 308 and may perform a similar computation for each of nodes 304 and 308 connecting to the one of nodes 312. Control circuitry 604 may sum each of the computations to determine a final value for the one of the nodes 312.

At 1210, control circuitry 604 determines whether the value indicating the first query and the second query are associated with the result indicating the merge or the replace operation by multiplying the second set of values by the weights associated with the connections between the second set of nodes and the node associated with the value and adding the resulting values. For example, control circuitry 604 may retrieve the values associated with nodes 312 and may retrieve weights 314 associated with the connections between nodes 312 and output node 316. Control circuitry 604 may multiply the values in nodes 312 with the corresponding weights 316 and may compute a sum of the multiplications for each of nodes 312. Control circuitry 604 may determine that the sum is the output value of the neural network. Control circuitry 604 may compare the output value to a lookup table to determine whether the output value indicates a merge or replace operation.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining whether a portion of a current query should be merged or replaced with a portion of a previous query, the method comprising:
    generating a neural network that takes a previous query and a current query as inputs and outputs a result indicating a merge or replace operation, wherein the neural network comprises a first set of nodes associated with an input layer of the neural network and a second set of nodes associated with an artificial layer of the neural network;
    training the neural network, based on a training data set, to determine weights associated with connections between the first set of nodes and the second set of nodes in the neural network, wherein training the neural network comprises:
        retrieving the training data set from memory, wherein the training data set comprises a model previous query, a model current query and a flag indicating whether the model previous query and model current query should be merged or replaced;
        mapping the model previous query and the model current query to nodes of the first set of nodes;
        computing, based on the weights between the first set of nodes in the input layer and the second set of nodes in the artificial layer, respective values for each node of the second set of nodes in the artificial layer;
        computing, based on the respective values for each node of the second set of nodes in the artificial layer, a model result indicating a merge or replace operation for the model previous query and the model current query;
        comparing the model result to the flag to determine whether the flag matches the model result;
        in response to determining that the flag does not match the model result, updating the weights associated with the nodes of the neural network based on a first error value; and
        in response to determining that the flag matches the model result, updating the weights associated with the nodes of the neural network based on a second error value, wherein the second error value is smaller than the first error value;
    receiving, from a user, a first query and a second query, wherein the first query is received prior to receiving the second query;
    generating a first set of tokens based on terms in the first query and a second set of tokens based on terms in the second query;
    mapping the first set of tokens and the second set of tokens to the first set of nodes;
    determining, using the weights associated with the connections between the first set of nodes and the second set of nodes, a value indicating whether the first query and the second query are associated with a result indicating a merge or replace operation;
    in response to determining, based on the value, that the first query and the second query are associated with a result indicating a merge operation, merging the first query and the second query; and
    in response to determining, based on the value, that the first query and the second query are associated with a result indicating a replace operation:
        selecting a first portion of the first query and a second portion of the second query that correspond to each other; and
        replacing the first portion of the first query with the second portion of the second query.

2. The method of claim 1, wherein the first query comprises a sequence of characters, and wherein generating the first set of tokens based on terms in the first query comprises:
    receiving a set of delimiting characters from memory;
    comparing the set of delimiting characters to the sequence of characters in the first query to identify a first position of a first character in the first query and a second position of a second character in the first query each matching a delimiting character of the set of delimiting characters; and
    generating a token of the first query comprising characters of the sequence of characters between the first position and the second position.

3. The method of claim 2, further comprising:
    comparing the first token to a set of filler words to determine whether the token matches a filler word of the set of filler words;
    in response to determining that the token matches the filler word of the set of filler words, excluding the token from the first set of tokens; and
    in response to determining that the token does not match a filler word of the set of filler words, adding the token to the first set of tokens.

4. The method of claim 1, wherein each node of the first set of nodes is associated with a token, and wherein mapping the first set of tokens to the first set of nodes comprises:
    matching a first token of the first set of tokens to a token associated with a first node of the first set of nodes of the input layer; and in response to the matching, updating a first value in the neural network associated with the first node to indicate that a token associated with the first node matches the first token.

5. The method of claim 4, wherein determining the value indicating whether the first query and the second query are associated with a result indicating a merge or replace operation comprises:
retrieving the weights associated with the connections between the first set of nodes and the second set of nodes;
determining a first set of values each associated with a respective node of the second set of nodes based on multiplying a second set of values each associated with a respective node of the first set of nodes by the weights associated with the connections between the first set of nodes and the second set of nodes; and
wherein determining the value indicating whether the first query and the second query are associated with the result indication the merge or the replace operation comprises multiplying the second set of values by the weights associated with the connections between the second set of nodes and the node associated with the value and adding the resulting values.

6. The method of claim 1, wherein the first query and the second query are received via a voice input device, further comprising, converting the first query to a first string of characters based on a speech-to-text conversion and converting the second query to a second string of characters based on the speech-to-text conversion.

7. The method of claim 1, wherein the first query is received, from the user, at a first time and wherein the second query is received, from the user, at a second time, and wherein mapping the first set of tokens and the second set of tokens to the first set of nodes comprises determining that less than a threshold maximum amount of time has elapsed between the first time and the second time.

8. The method of claim 1, wherein selecting a first portion of the first query and a second portion of the second query that correspond to each other further comprises:
identifying a first subset of tokens of the first set of tokens corresponding to the first portion of the first query;
determining a first type associated with the first set of tokens;
identifying a second subset of tokens of the second set of tokens corresponding to the second portion of the first query, wherein a second type associated with the second set of tokens matches the first type.

9. The method of claim 1, further comprising generating for display search results corresponding to one of (1) a first search query generated based on replacing the first portion of the first query with the second portion of the second query and (2) a second search query generated based on merging the first query and the second query.

10. A system for determining whether a portion of a current query should be merged or replaced with a portion of a previous query, the system comprising control circuitry configured to:
generate a neural network that takes a previous query and a current query as inputs and outputs a result indicating a merge or replace operation, wherein the neural network comprises a first set of nodes associated with an input layer of the neural network and a second set of nodes associated with an artificial layer of the neural network;
train the neural network, based on a training data set, to determine weights associated with connections between the first set of nodes and the second set of nodes in the neural network, based on:
retrieving the training data set from memory, wherein the training data set comprises a model previous query, a model current query and a flag indicating whether the model previous query and model current query should be merged or replaced;
mapping the model previous query and the model current query to nodes of the first set of nodes;
computing, based on the weights between the first set of nodes in the input layer and the second set of nodes in the artificial layer, respective values for each node of the second set of nodes in the artificial layer;
computing, based on the respective values for each node of the second set of nodes in the artificial layer, a model result indicating a merge or replace operation for the model previous query and the model current query;
comparing the model result to the flag to determine whether the flag matches the model result;
in response to determining that the flag does not match the model result, updating the weights associated with the nodes of the neural network based on a first error value; and
in response to determining that the flag matches the model result, updating the weights associated with the nodes of the neural network based on a second error value, wherein the second error value is smaller than the first error value;
receive, from a user, a first query and a second query, wherein the first query is received prior to receiving the second query;
generate a first set of tokens based on terms in the first query and a second set of tokens based on terms in the second query;
map the first set of tokens and the second set of tokens to the first set of nodes;
determine, using the weights associated with the connections between the first set of nodes and the second set of nodes, a value indicating whether the first query and the second query are associated with a result indicating a merge or replace operation;
in response to determining, based on the value, that the first query and the second query are associated with a result indicating a merge operation, merge the first query and the second query; and
in response to determining, based on the value, that the first query and the second query are associated with a result indicating a replace operation:
select a first portion of the first query and a second portion of the second query that correspond to each other; and
replace the first portion of the first query with the second portion of the second query.

11. The system of claim 10, wherein the first query comprises a sequence of characters, and wherein the control circuitry is further configured, when generating the first set of tokens based on terms in the first query, to:
receive a set of delimiting characters from memory;
compare the set of delimiting characters to the sequence of characters in the first query to identify a first position of a first character in the first query and a second position of a second character in the first query each matching a delimiting character of the set of delimiting characters; and generate a token of the first query comprising characters of the sequence of characters between the first position and the second position.

12. The system of claim 11, wherein the control circuitry is further configured to:
compare the first token to a set of filler words to determine whether the token matches a filler word of the set of filler words;
in response to determining that the token matches the filler word of the set of filler words, exclude the token from the first set of tokens; and
in response to determining that the token does not match a filler word of the set of filler words, add the token to the first set of tokens.

13. The system of claim 10, wherein each node of the first set of nodes is associated with a token, and wherein the control circuitry is further configured, when mapping the first set of tokens to the first set of nodes, to:
match a first token of the first set of tokens to a token associated with a first node of the first set of nodes of the input layer; and
in response to the matching, update a first value in the neural network associated with the first node to indicate that a token associated with the first node matches the first token.

14. The system of claim 13, wherein the control circuitry is further configured, when determining the value indicating whether the first query and the second query are associated with a result indicating a merge or replace operation, to:
retrieve the weights associated with the connections between the first set of nodes and the second set of nodes;
determine first set of values each associated with a respective node of the second set of nodes based on multiplying a second set of values each associated with a respective node of the first set of nodes by the weights associated with the connections between the first set of nodes and the second set of nodes; and
wherein the control circuitry is further configured, when determining the value indicating whether the first query and the second query are associated with the result indication the merge or the replace operation, to multiply the second set of values by the weights associated with the connections between the second set of nodes and the node associated with the value and adding the resulting values.

15. The system of claim 10, wherein the first query and the second query are received by the control circuitry via a voice input device, and wherein the control circuitry is further configured to convert the first query to a first string of characters based on a speech-to-text conversion and converting the second query to a second string of characters based on the speech-to-text conversion.

16. The system of claim 10, wherein the first query is received, from the user, at a first time and wherein the second query is received, from the user, at a second time, and wherein the control circuitry is further configured, when mapping the first set of tokens and the second set of tokens to the first set of nodes, to determine that less than a threshold maximum amount of time has elapsed between the first time and the second time.

17. The system of claim 10, wherein the control circuitry is further configured, when selecting a first portion of the first query and a second portion of the second query that correspond to each other, to:
identify a first subset of tokens of the first set of tokens corresponding to the first portion of the first query;
determine a first type associated with the first set of tokens;
identify a second subset of tokens of the second set of tokens corresponding to the second portion of the first query, wherein a second type associated with the second set of tokens matches the first type.

18. The system of claim 10, wherein the control circuitry is further configured to generate for display search results corresponding to one of (1) a first search query generated based on replacing the first portion of the first query with the second portion of the second query and (2) a second search query generated based on merging the first query and the second query.

* * * * *